United States Patent
Chen et al.

(10) Patent No.: US 10,728,221 B2
(45) Date of Patent: *Jul. 28, 2020

(54) HOSTED PAYLOAD OPERATIONS

(71) Applicant: THE BOEING COMPANY, Chicago, IL (US)

(72) Inventors: Yi-Feng James Chen, Chicago, IL (US); Haig F. Krikorian, Chicago, IL (US); Robert J. Winig, Chicago, IL (US); Jonathan Fish, Chicago, IL (US); Craig Benjamin, Chicago, IL (US)

(73) Assignee: The Boeing Company, Chicago, IL (US)

( * ) Notice: Subject to any disclaimer, the term of this patent is extended or adjusted under 35 U.S.C. 154(b) by 296 days.

This patent is subject to a terminal disclaimer.

(21) Appl. No.: 15/451,205

(22) Filed: Mar. 6, 2017

(65) Prior Publication Data

US 2018/0255024 A1 Sep. 6, 2018

(51) Int. Cl.
*H04L 29/06* (2006.01)
*H04B 7/185* (2006.01)
(Continued)

(52) U.S. Cl.
CPC ..... *H04L 63/0428* (2013.01); *H04B 7/18513* (2013.01); *H04W 12/0017* (2019.01); *H04B 7/0617* (2013.01); *H04B 7/185* (2013.01)

(58) Field of Classification Search
CPC ... H04L 67/12; H04L 63/0428; H04L 63/065; H04L 63/0478; H04B 7/155; H04B 7/185–18519
See application file for complete search history.

(56) References Cited

U.S. PATENT DOCUMENTS 5,701,603 A 12/1997 Norimatsu
7,542,716 B2 6/2009 Bell et al.
(Continued)

FOREIGN PATENT DOCUMENTS

EP 1085680 3/2001
EP 1936833 6/2008
(Continued)

OTHER PUBLICATIONS

Halimi et al., "Applicability of Asymmetric Cryptography for Space Data Links Security Systems", 2016 IEEE Aerospace Conference, Mar. 5, 2016, pp. 1-13, IEEE.
(Continued)

*Primary Examiner* — Daniel B Potratz
(74) *Attorney, Agent, or Firm* — Haynes and Boone LLP

(57) ABSTRACT

A method for hosted payload operations comprises transmitting, by a hosted payload (HoP) operation center (HOC), encrypted hosted commands to a host spacecraft operations center (SOC). Also, the method comprises transmitting, by the host SOC, encrypted host commands and the encrypted hosted commands to a vehicle. In addition, the method comprises reconfiguring a host payload according to unencrypted host commands, and reconfiguring a hosted payload according to unencrypted hosted commands. Additionally, the method comprises transmitting, by a host payload antenna, host payload data to a host receiving antenna. In addition, the method comprises transmitting, by a hosted payload antenna, hosted payload data to a hosted receiving antenna and/or host receiving antenna. Also, the method comprises transmitting, by a telemetry transmitter on the vehicle, encrypted host telemetry and encrypted hosted telemetry to the host SOC. Further, the method comprises transmitting, by the host SOC, the encrypted hosted telemetry to the HOC.

20 Claims, 14 Drawing Sheets

Figure 1:
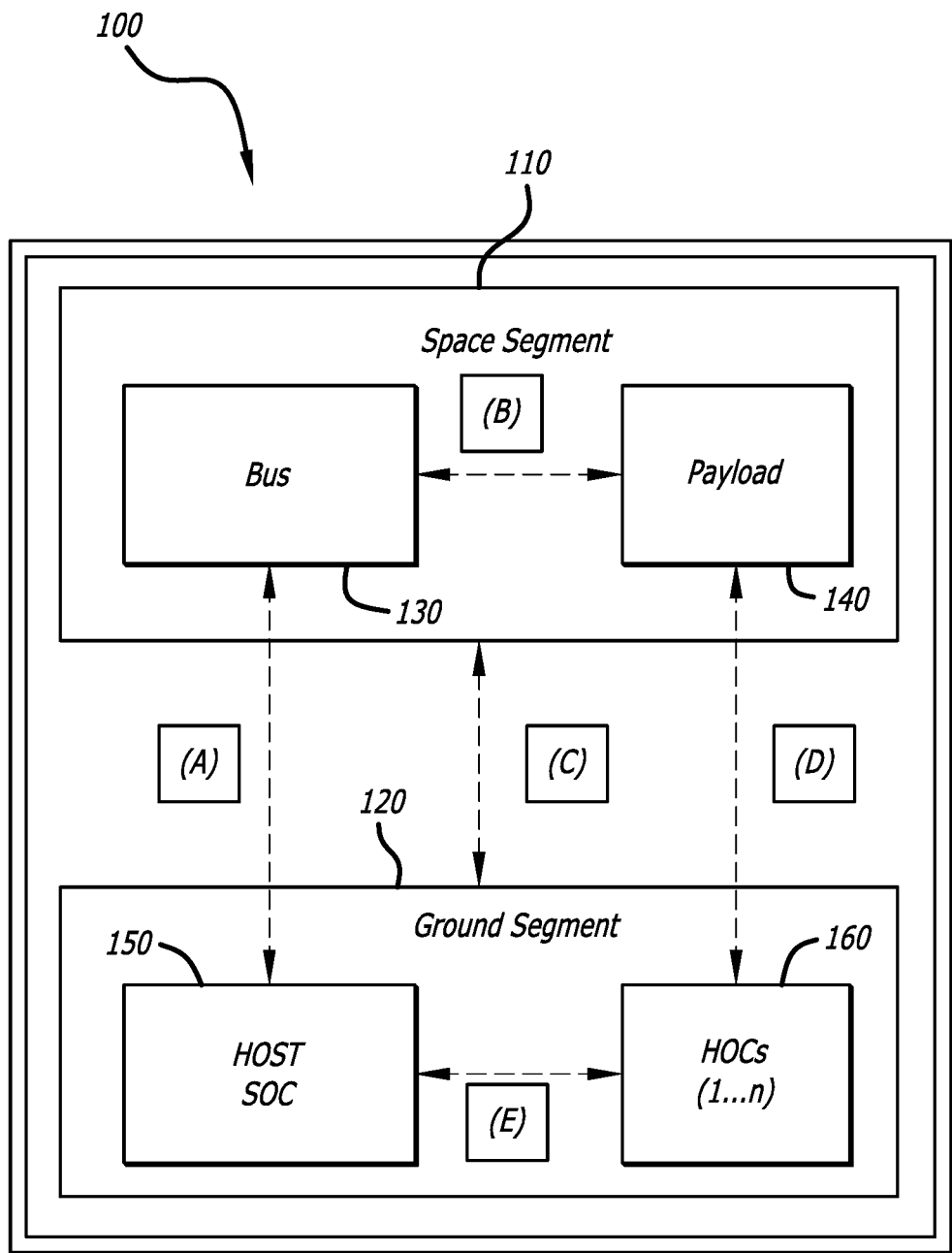

(51) Int. Cl.
*H04B 7/06* (2006.01)
*H04W 12/00* (2009.01)

(56) References Cited

U.S. PATENT DOCUMENTS

| | | |
|---|---|---|
| 8,200,149 B1 | 6/2012 | Chen |
| 8,521,427 B1 | 8/2013 | Luyks |
| 8,614,945 B2 | 12/2013 | Brunnenmeyer |
| 8,873,456 B2 * | 10/2014 | Krikorian ............ H04B 7/1851 370/316 |
| 9,042,295 B1 | 5/2015 | Baiter et al. |
| 9,337,918 B2 | 5/2016 | Bell et al. |
| 2002/0104920 A1 | 8/2002 | Thompson et al. |
| 2003/0017827 A1 | 1/2003 | Ciaburro et al. |
| 2007/0133528 A1 | 6/2007 | Jin et al. |
| 2008/0055151 A1 | 3/2008 | Hudson et al. |
| 2008/0149776 A1 | 6/2008 | Benedict |
| 2008/0153414 A1 | 6/2008 | Ho et al. |
| 2009/0052369 A1 * | 2/2009 | Atkinson ............... B64G 1/641 370/316 |
| 2013/0046422 A1 | 2/2013 | Cabos |
| 2013/0077788 A1 * | 3/2013 | Blanchard ........... H04B 7/18593 380/255 |
| 2013/0137365 A1 | 5/2013 | Taylor |
| 2014/0099986 A1 | 4/2014 | Kikuchi et al. |
| 2014/0119385 A1 * | 5/2014 | Hoffmeyer ......... H04B 7/18515 370/474 |
| 2014/0303813 A1 | 10/2014 | Ihns |
| 2015/0162955 A1 | 6/2015 | Burch |
| 2015/0203213 A1 | 7/2015 | Levien et al. |
| 2016/0087713 A1 | 3/2016 | Oderman et al. |
| 2017/0012697 A1 | 1/2017 | Gong et al. |
| 2017/0041065 A1 | 2/2017 | Goettle, Jr. et al. |
| 2017/0134103 A1 | 5/2017 | Tessandori et al. |
| 2018/0254822 A1 | 9/2018 | Miller et al. |
| 2018/0254823 A1 | 9/2018 | Miller et al. |
| 2018/0254866 A1 | 9/2018 | Chen et al. |
| 2018/0255025 A1 | 9/2018 | Chen et al. |
| 2018/0255026 A1 | 9/2018 | Winig et al. |
| 2018/0255027 A1 | 9/2018 | Winig et al. |
| 2018/0255455 A1 | 9/2018 | Winig et al. |
| 2019/0082319 A1 | 3/2019 | Chen et al. |

FOREIGN PATENT DOCUMENTS

| | | |
|---|---|---|
| EP | 2573956 | 3/2013 |
| JP | 2000166046 | 6/2000 |
| WO | WO 1996/032568 | 10/1996 |
| WO | WO 1999/040693 | 8/1999 |
| WO | WO 2013/130812 | 9/2013 |

OTHER PUBLICATIONS

Pang et al., "CHIRP Program Lessons Learned From the Contractor Program Management Team Perspective", 2012 IEEE Aerospace Conference, Mar. 3, 2012, pp. 1-7, XP032230091, DOI: 10.1109/AERO.2012.6187278, ISBN: 978-1-4577-0556-4, IEEE.

* cited by examiner

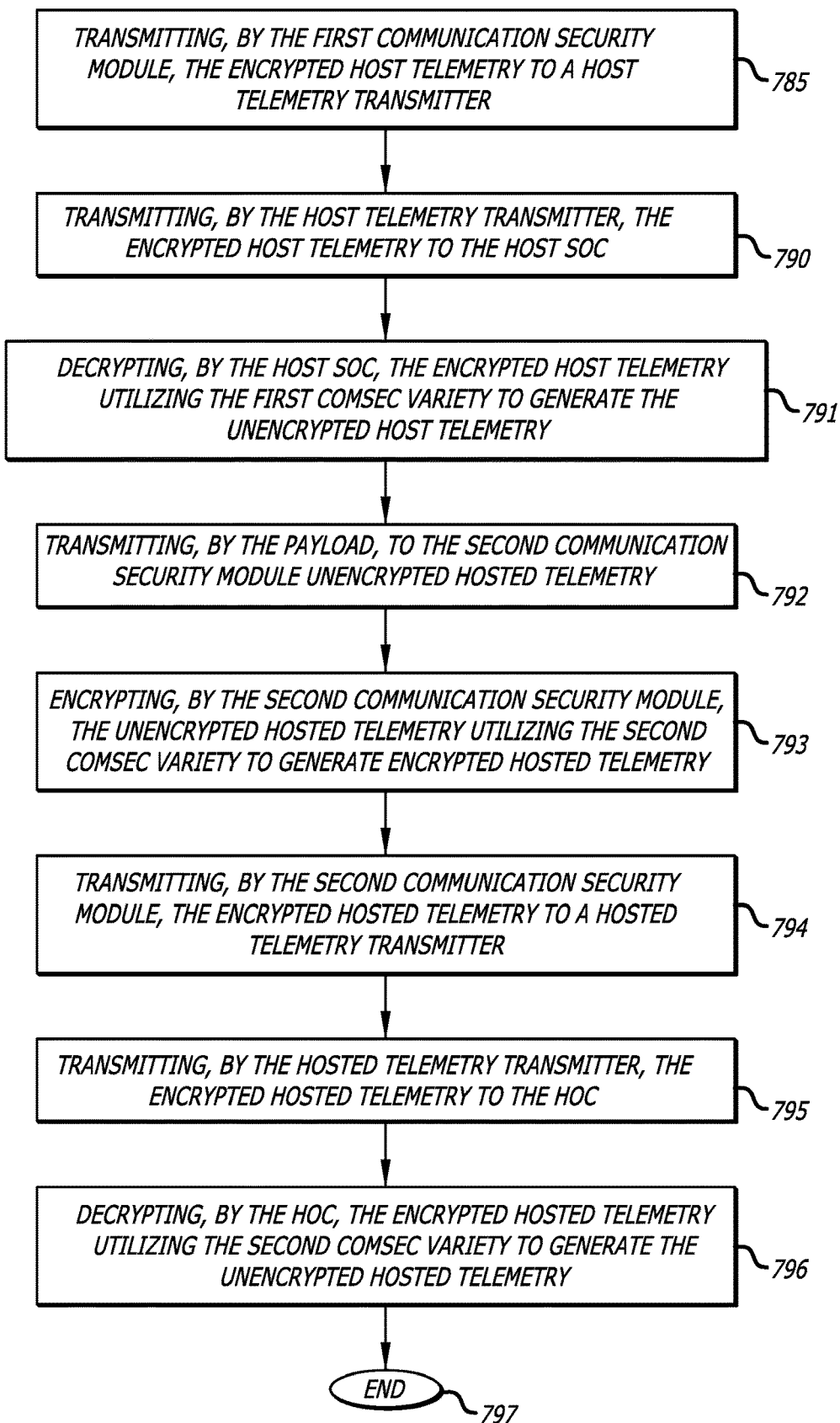

HOSTED PAYLOAD OPERATIONS

FIELD

The present disclosure relates to payload operations. In particular, it relates to hosted payload operations.

BACKGROUND

Currently, typical payload operations for a vehicle (e.g., a satellite) have the ability to perform switching of inputs to outputs of the payload on the vehicle. All of this switching on the payload is commanded and controlled by a single satellite controller with no resource allocation privacy.

As such, there is a need for an improved payload operations design that allows for privacy in the allocation of resources on the payload.

SUMMARY

The present disclosure relates to a method, system, and apparatus for hosted payload operations. In one or more embodiments, a method for hosted payload operations comprises transmitting, by a hosted payload (HoP) operation center (HOC), encrypted hosted commands to a host spacecraft operations center (SOC). Also, the method comprises transmitting, by the host SOC, encrypted host commands and the encrypted hosted commands to a vehicle. In one or more embodiments, the encrypted host commands are encrypted utilizing a first communication security (COMSEC) variety and the encrypted hosted commands are encrypted utilizing a second COMSEC variety. In addition, the method comprises decrypting, by a first communication security module on the vehicle, the encrypted host commands utilizing the first COMSEC variety to generate unencrypted host commands. Additionally, the method comprises decrypting, by a second communication security module on the vehicle, the encrypted hosted commands utilizing the second COMSEC variety to generate unencrypted hosted commands. Also, the method comprises reconfiguring a host payload on the vehicle according to the unencrypted host commands. Additionally, the method comprises reconfiguring a hosted payload on the vehicle according to the unencrypted hosted commands. In addition, the method comprises transmitting, by a host payload antenna on the vehicle, host payload data to a host receiving antenna. Also, the method comprises transmitting, by a hosted payload antenna on the vehicle, hosted payload data to a hosted receiving antenna and/or the host receiving antenna. Additionally, the method comprises encrypting, by the first communication security module, unencrypted host telemetry from the host payload and unencrypted hosted telemetry from the hosted payload by utilizing the first COMSEC variety to generate encrypted host telemetry and encrypted hosted telemetry. Also, the method comprises transmitting, by a telemetry transmitter on the vehicle, the encrypted host telemetry and the encrypted hosted telemetry to the host SOC. Further, the method comprises transmitting, by the host SOC, the encrypted hosted telemetry to the HOC.

In at least one embodiment, the reconfiguring of the host payload according to the unencrypted host commands and the reconfiguring of the hosted payload according to the unencrypted hosted commands comprises adjusting transponder power, transponder spectrum monitoring, transponder connectivity, transponder gain settings, transponder limiter settings, transponder automatic level control settings, transponder phase settings, internal gain generation, bandwidth for at least one beam, at least one frequency band for at least one beam, transponder beamforming settings, effective isotropic radiation power (EIRP) for at least one beam, transponder channels, and/or beam steering.

In one or more embodiments, the reconfiguring of the host payload according to the unencrypted host commands and the reconfiguring of the hosted payload according to the unencrypted hosted commands comprises reconfiguring at least one antenna, at least one analog-to-digital converter, at least one digital-to-analog converter, at least one beamformer, at least one digital channelizer, at least one demodulator, at least one modulator, at least one digital switch matrix, and/or at least one digital combiner.

In at least one embodiment, the vehicle is an airborne vehicle. In one or more embodiments, the airborne vehicle is a satellite, aircraft, unmanned aerial vehicle (UAV), or space plane.

In one or more embodiments, the method further comprises encrypting, by the HOC, the unencrypted hosted commands by utilizing the second COMSEC variety to produce the encrypted hosted commands. Further, the method comprises encrypting, by the host SOC, the unencrypted host commands by utilizing the first COMSEC variety to produce the encrypted host commands.

In at least one embodiment, the method further comprises receiving, by a host command receiver on the vehicle, the encrypted host commands. Also, the method comprises receiving, by a hosted command receiver on the vehicle, the encrypted hosted commands. In addition, the method comprises transmitting, by the host command receiver, the encrypted host commands to the first communication security module. Further, the method comprises transmitting, by the hosted command receiver, the encrypted hosted commands to the second communication security module.

In one or more embodiments, the method further comprises transmitting, by the first communication security module, the unencrypted host commands to the host payload. Also, the method comprises transmitting, by the second communication security module, the unencrypted hosted commands to the hosted payload.

In at least one embodiment, the method further comprises transmitting, by the host payload, to the first communication security module the unencrypted host telemetry. In some embodiments, the method further comprises transmitting, by the hosted payload, to the first communication security module the unencrypted hosted telemetry.

In one or more embodiments, the method further comprises transmitting, by the first communication security module, the encrypted host telemetry and the encrypted hosted telemetry to the telemetry transmitter.

In at least one embodiment, the method further comprises decrypting, by the host SOC, the encrypted host telemetry utilizing the first COMSEC variety and utilizing a database without hosted decommutated information to generate the unencrypted host telemetry. Also, the method comprises decrypting, by the HOC, the encrypted hosted telemetry utilizing the first COMSEC variety and utilizing a database without host decommutated information to generate the unencrypted hosted telemetry.

In one or more embodiments, a method for hosted payload operations comprises transmitting, by the HOC, the encrypted hosted commands to a host spacecraft operations center (SOC). The method further comprises transmitting, by the host SOC, the encrypted host commands and the encrypted hosted commands to a vehicle. Also, the method comprises decrypting, by the first communication security module, the encrypted host commands utilizing the first COMSEC variety to generate the unencrypted host commands. In addition, the method comprises decrypting, by the second communication security module, the encrypted hosted commands utilizing the second COMSEC variety to generate the unencrypted hosted commands. Additionally, the method comprises reconfiguring the host payload according to the unencrypted host commands. Also, the method comprises reconfiguring the hosted payload according to the unencrypted hosted commands. Also, the method comprises transmitting, by a host payload antenna on the vehicle, host payload data to a host receiving antenna. Additionally, the method comprises transmitting, by a hosted payload antenna on the vehicle, hosted payload data to a hosted receiving antenna and/or the host receiving antenna. In addition, the method comprises encrypting, by the first communication security module, unencrypted host telemetry utilizing the first COMSEC variety to generate encrypted host telemetry. Additionally, the method comprises transmitting, by the host telemetry transmitter, the encrypted host telemetry to the host SOC. Also, the method comprises encrypting, by the second communication security module, unencrypted hosted telemetry utilizing the second COMSEC variety to generate encrypted hosted telemetry. In addition, the method comprises transmitting, by the hosted telemetry transmitter, the encrypted hosted telemetry to the host SOC. Further, the method comprises transmitting, by the host SOC, the encrypted hosted telemetry to the HOC.

In at least one embodiment, a method for hosted payload operations comprises transmitting, by a hosted payload (HoP) operation center (HOC), encrypted hosted commands to a vehicle. The method further comprises transmitting, by the host SOC, encrypted host commands to the vehicle. Also, the method comprises decrypting, by a first communication security module on the vehicle, the encrypted host commands utilizing a first COMSEC variety to generate unencrypted host commands. In addition, the method comprises decrypting, by a second communication security module on the vehicle, the encrypted hosted commands utilizing a second COMSEC variety to generate unencrypted hosted commands. Additionally, the method comprises reconfiguring a host payload according to the unencrypted host commands. In addition, the method comprises reconfiguring a hosted payload according to the unencrypted hosted commands. Also, the method comprises transmitting, by a host payload antenna on the vehicle, host payload data to a host receiving antenna. Additionally, the method comprises transmitting, by a hosted payload antenna on the vehicle, hosted payload data to a hosted receiving antenna and/or the host receiving antenna. In addition, the method comprises encrypting, by the first communication security module, unencrypted host telemetry utilizing the first COMSEC variety to generate encrypted host telemetry. Additionally, the method comprises transmitting, by a host telemetry transmitter on the vehicle, the encrypted host telemetry to the host SOC. Also, the method comprises encrypting, by the second communication security module, unencrypted hosted telemetry utilizing the second COMSEC variety to generate encrypted hosted telemetry. Further, the method comprises transmitting, by the hosted telemetry transmitter, the encrypted hosted telemetry to the HOC.

In one or more embodiments, a system for hosted payload operations comprises a hosted payload (HoP) operation center (HOC) to transmit encrypted hosted commands to a host spacecraft operations center (SOC). The system further comprises the host SOC to transmit encrypted host commands and the encrypted hosted commands to a vehicle. In one or more embodiments, the encrypted host commands are encrypted utilizing a first communication security (COMSEC) variety and the encrypted hosted commands are encrypted utilizing a second COMSEC variety. Also, the system comprises a first communication security module on the vehicle to decrypt the encrypted host commands utilizing the first COMSEC variety to generate unencrypted host commands. In addition, the system comprises a second communication security module on the vehicle to decrypt the encrypted hosted commands utilizing the second COMSEC variety to generate unencrypted hosted commands. Additionally, the system comprises a host payload on the vehicle reconfigured according to the unencrypted host commands. Also, the system comprises a hosted payload on the vehicle reconfigured according to the unencrypted hosted commands. In addition, the system comprises a host payload antenna on the vehicle to transmit host payload data to a host receiving antenna. Additionally, the system comprises a hosted payload antenna on the vehicle to transmit hosted payload data to a hosted receiving antenna and/or the host receiving antenna. Also, the system comprises the first communication security module to encrypt unencrypted host telemetry from the host payload and the unencrypted hosted telemetry from the hosted payload by utilizing the first COMSEC variety to generate encrypted host telemetry and encrypted hosted telemetry. In addition, the system comprises a telemetry transmitter on the vehicle to transmit the encrypted host telemetry and the encrypted hosted telemetry to the host SOC. Further, the system comprises the host SOC to transmit the encrypted hosted telemetry to the HOC.

In at least one embodiment, a system for hosted payload operations comprises a hosted payload (HoP) operation center (HOC) to transmit encrypted hosted commands to a host spacecraft operations center (SOC). The system further comprises the host SOC to transmit encrypted host commands and the encrypted hosted commands to a vehicle. In one or more embodiments, the encrypted host commands are encrypted utilizing a first communication security (COMSEC) variety, and the encrypted hosted commands are encrypted utilizing a second COMSEC variety. Also, the system comprises a first communication security module to decrypt the encrypted host commands utilizing the first COMSEC variety to generate unencrypted host commands. In addition, the system comprises a second communication security module to decrypt the encrypted hosted commands utilizing the second COMSEC variety to generate the unencrypted hosted commands. Additionally, the system comprises a host payload reconfigured according to the unencrypted host commands. Also, the system comprises a hosted payload reconfigured according to the unencrypted hosted commands. In addition, the system comprises a host payload antenna on the vehicle to transmit host payload data to a host receiving antenna. Also, the system comprises a hosted payload antenna on the vehicle to transmit hosted payload data to a hosted receiving antenna and/or the host receiving antenna. In addition, the system comprises the first communication security module to encrypt unencrypted host telemetry utilizing the first COMSEC variety to generate encrypted host telemetry. Also, the system comprises the host telemetry transmitter to transmit the encrypted host telemetry to the host SOC. In addition, the system comprises the second communication security module to encrypt unencrypted hosted telemetry utilizing the second COMSEC variety to generate encrypted hosted telemetry. Also, the system comprises a hosted telemetry transmitter to transmit the encrypted hosted telemetry to the host SOC. Further, the system comprises the host SOC to transmit the encrypted hosted telemetry to the HOC.

In at least one embodiment, a system for hosted payload operations comprises a hosted payload (HoP) operation center (HOC) to transmit encrypted hosted commands to a vehicle. The system further comprises the host SOC to transmit encrypted host commands to the vehicle. In one or more embodiments, the encrypted host commands are encrypted utilizing a first communication security (COMSEC) variety, and the encrypted hosted commands are encrypted utilizing a second COMSEC variety. Also, the system comprises a first communication security module on the vehicle to decrypt the encrypted host commands utilizing the first communication security (COMSEC) variety to generate unencrypted host commands. In addition, the system comprises a second communication security module on the vehicle to decrypt the encrypted hosted commands utilizing the second COMSEC variety to generate unencrypted hosted commands. Additionally, the system comprises a host payload reconfigured according to the unencrypted host commands. Also, the system comprises a hosted payload reconfigured according to the unencrypted hosted commands. In addition, the system comprises a host payload antenna on the vehicle to transmit host payload data to a host receiving antenna. Additionally, the system comprises a hosted payload antenna on the vehicle to transmit hosted payload data to a hosted receiving antenna and/or the host receiving antenna. Also, the system comprises the first communication security module to encrypt unencrypted host telemetry utilizing the first COMSEC variety to generate encrypted host telemetry. In addition, the system comprises a host telemetry transmitter on the vehicle to transmit the encrypted host telemetry to the host SOC. Also, the system comprises the second communication security module to encrypt unencrypted hosted telemetry utilizing the second COMSEC variety to generate encrypted hosted telemetry. Further, the system comprises the hosted telemetry transmitter to transmit the encrypted hosted telemetry to the HOC.

The features, functions, and advantages can be achieved independently in various embodiments of the present disclosure or may be combined in yet other embodiments.

DRAWINGS

These and other features, aspects, and advantages of the present disclosure will become better understood with regard to the following description, appended claims, and accompanying drawings where:

FIG. 1 is a diagram showing simplified architecture for the disclosed system for hosted payload operations, in accordance with at least one embodiment of the present disclosure.

Figure 2:
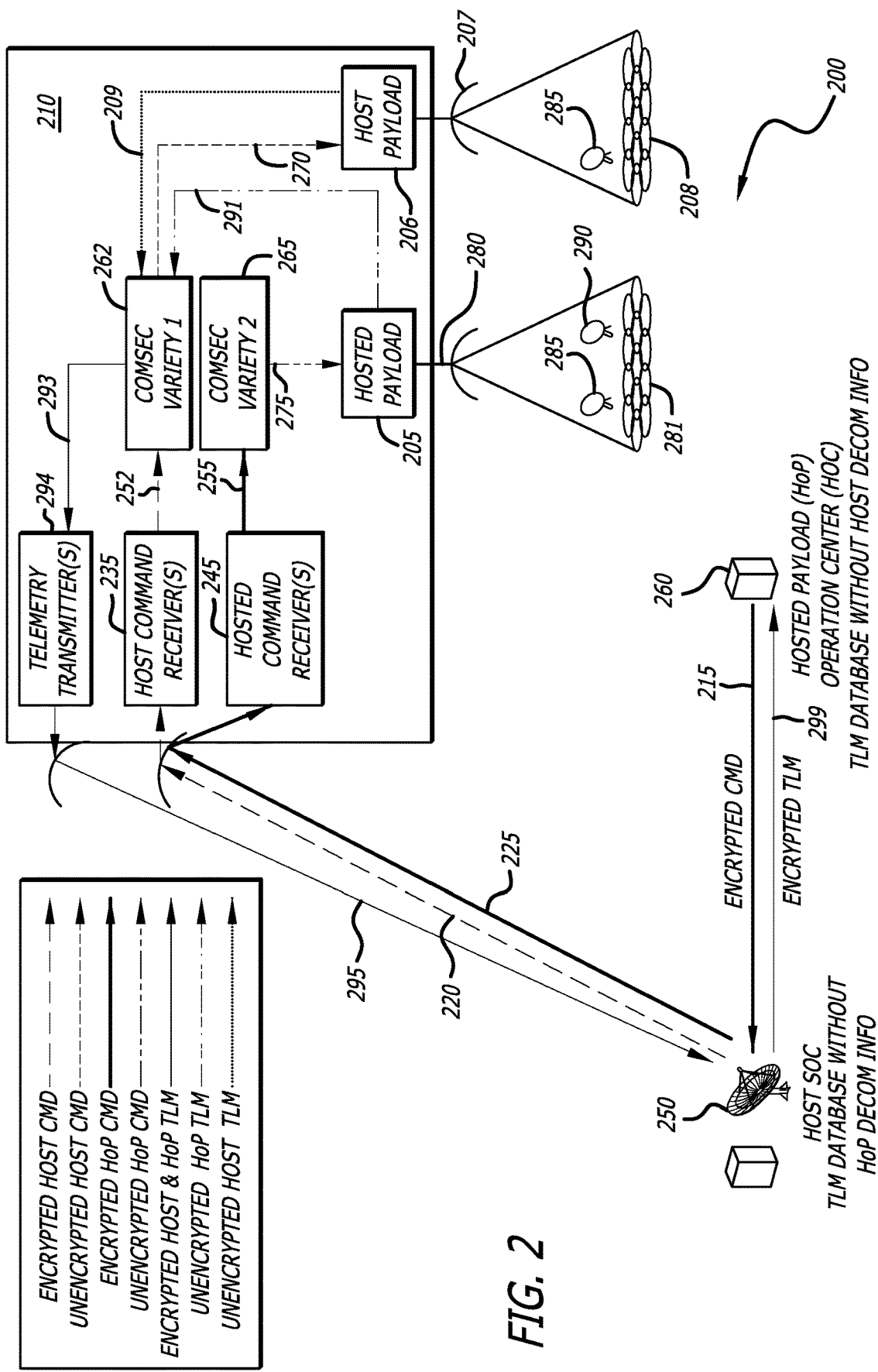

FIG. 2 is a diagram showing the disclosed system for hosted payload operations where the host user transmits encrypted host commands (encrypted utilizing a first COMSEC variety) and encrypted hosted commands (encrypted utilizing the second COMSEC variety) to a vehicle, and where the host telemetry and the hosted telemetry are both encrypted using the first COMSEC variety, in accordance with at least one embodiment of the present disclosure.

Figure 3A:
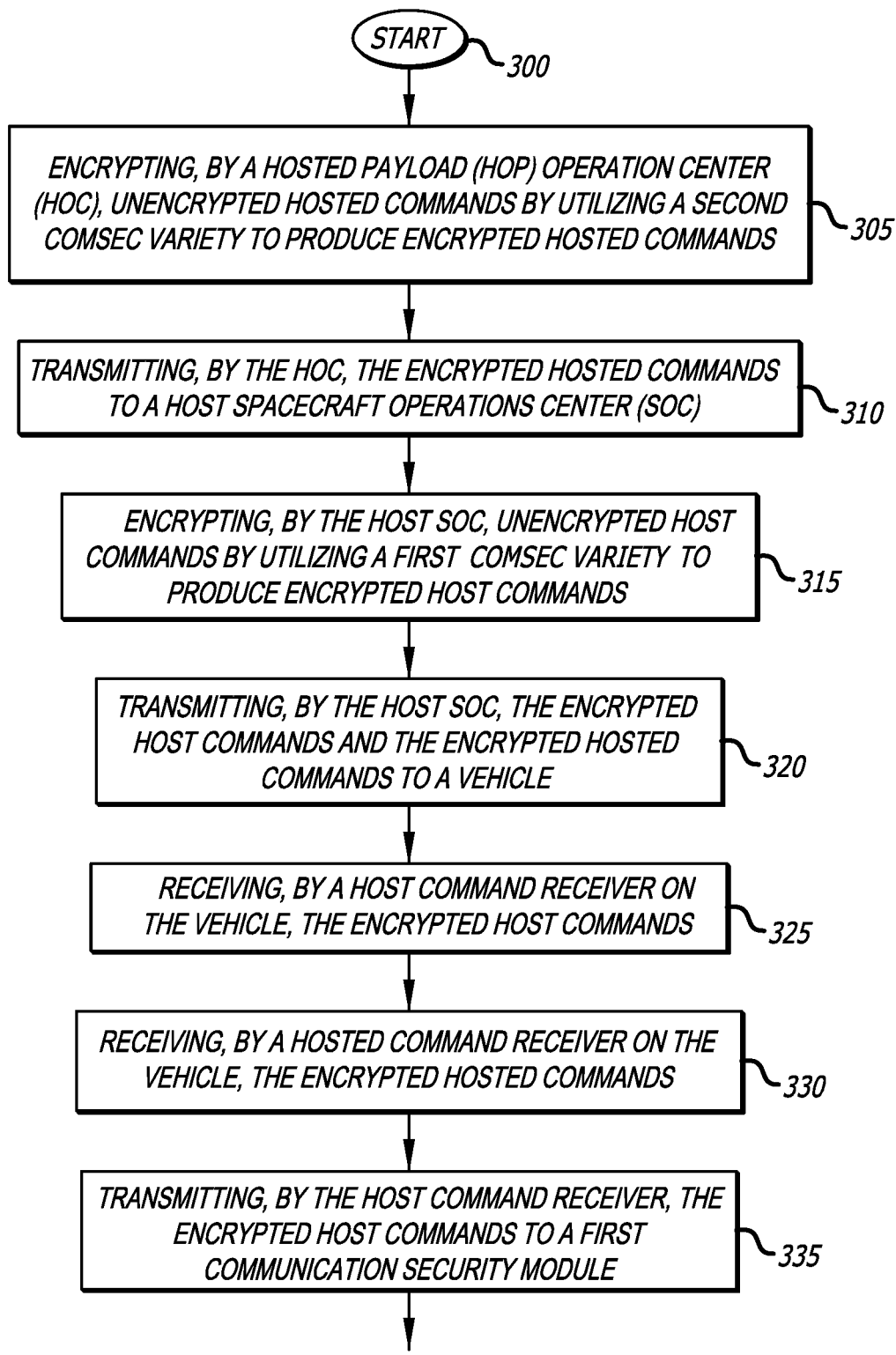
Figure 3B:
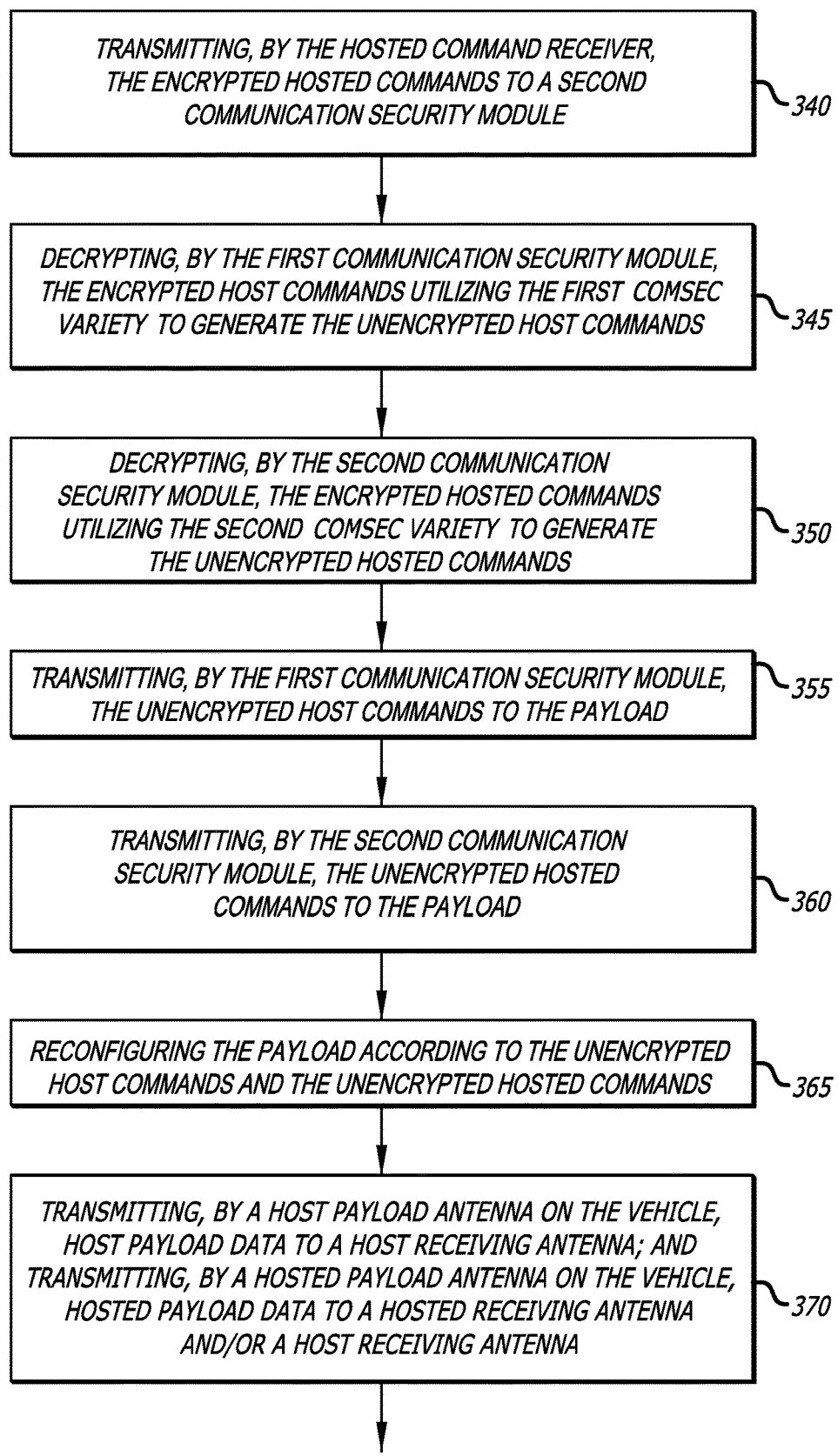
Figure 3C:
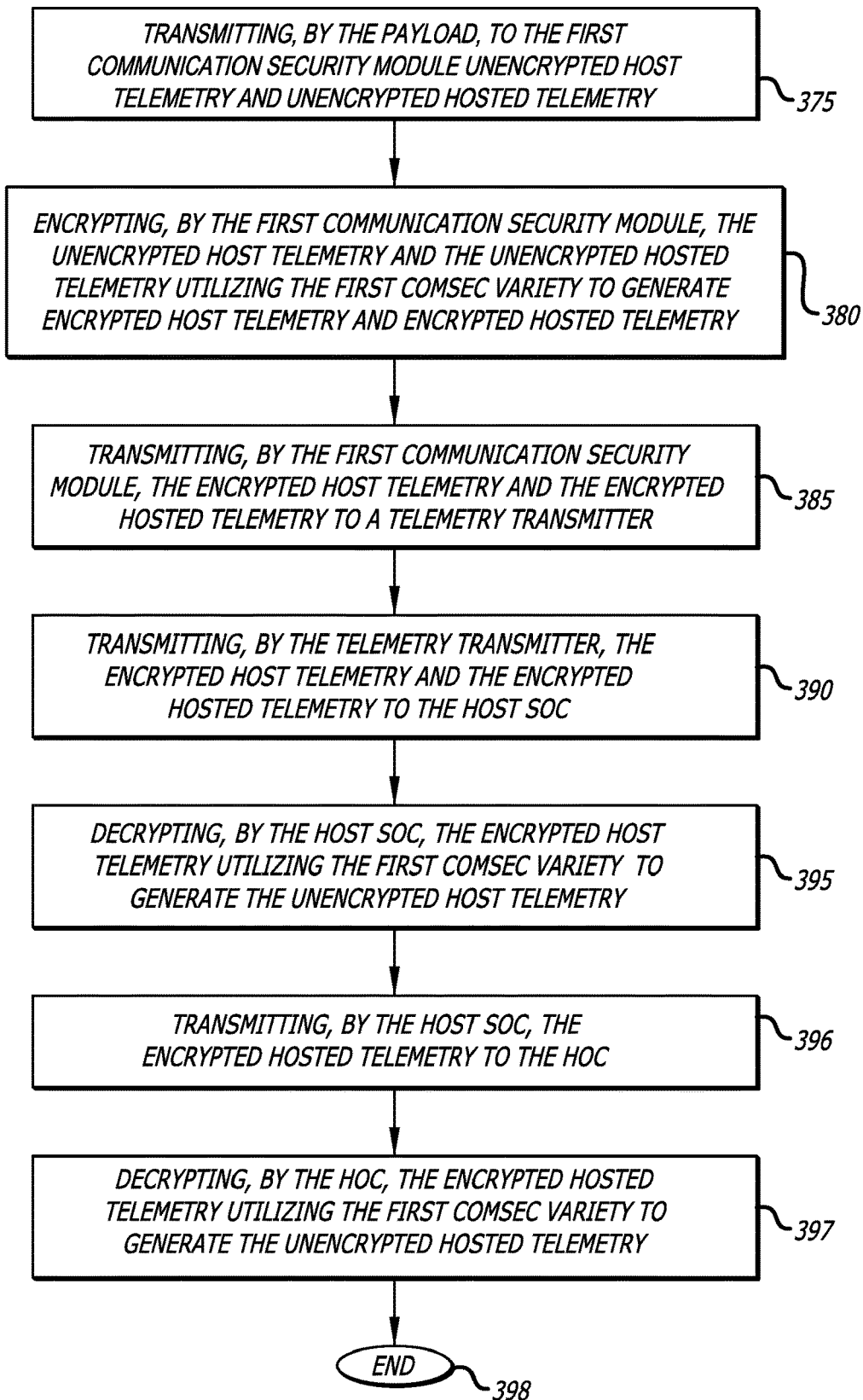

FIGS. 3A, 3B, and 3C together show a flow chart for the disclosed method for hosted payload operations where the host user transmits encrypted host commands (encrypted utilizing a first COMSEC variety) and encrypted hosted commands (encrypted utilizing the second COMSEC variety) to a vehicle, and where the host telemetry and the hosted telemetry are both encrypted using the first COMSEC variety, in accordance with at least one embodiment of the present disclosure.

Figure 4:
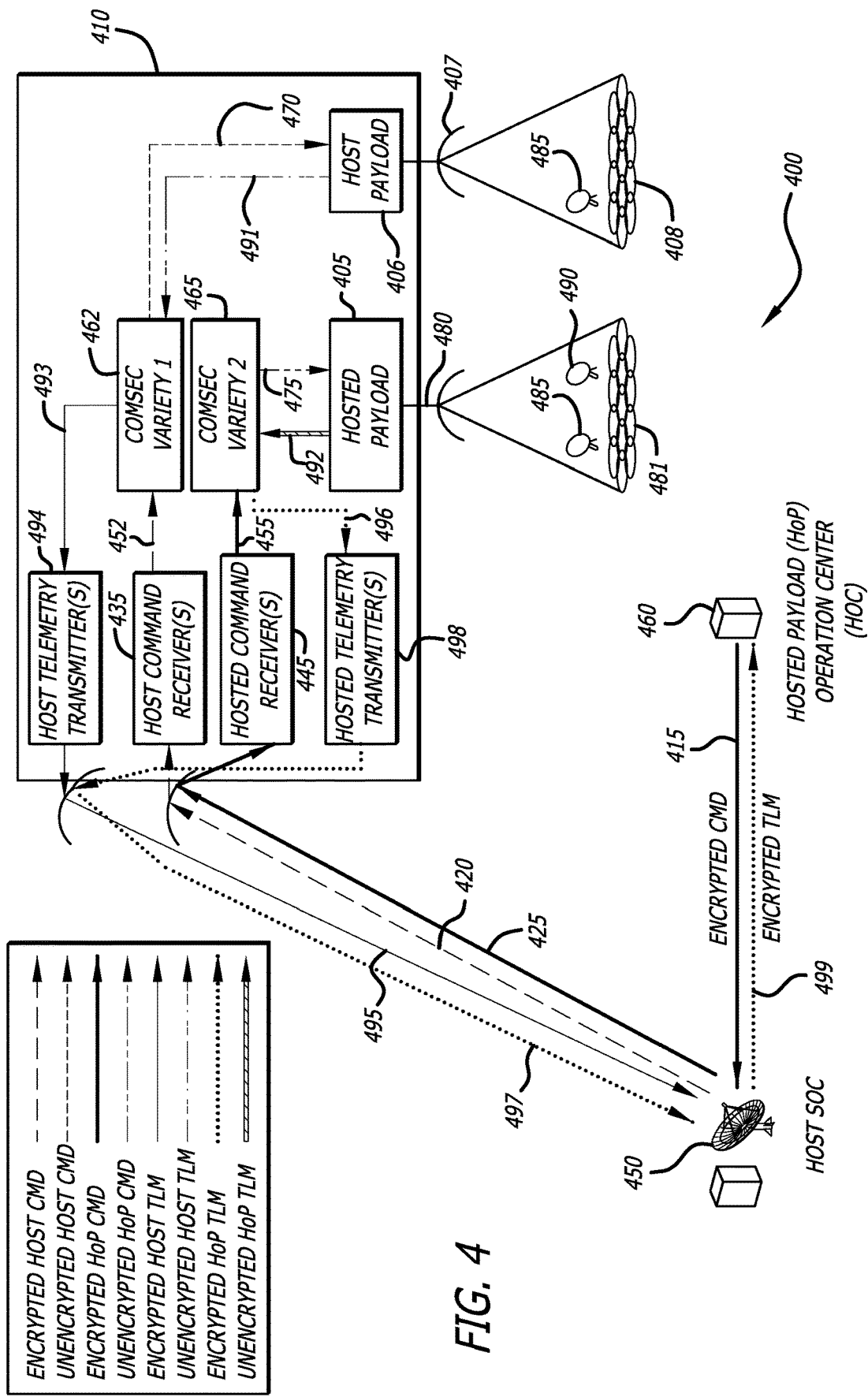
Figure 5A:
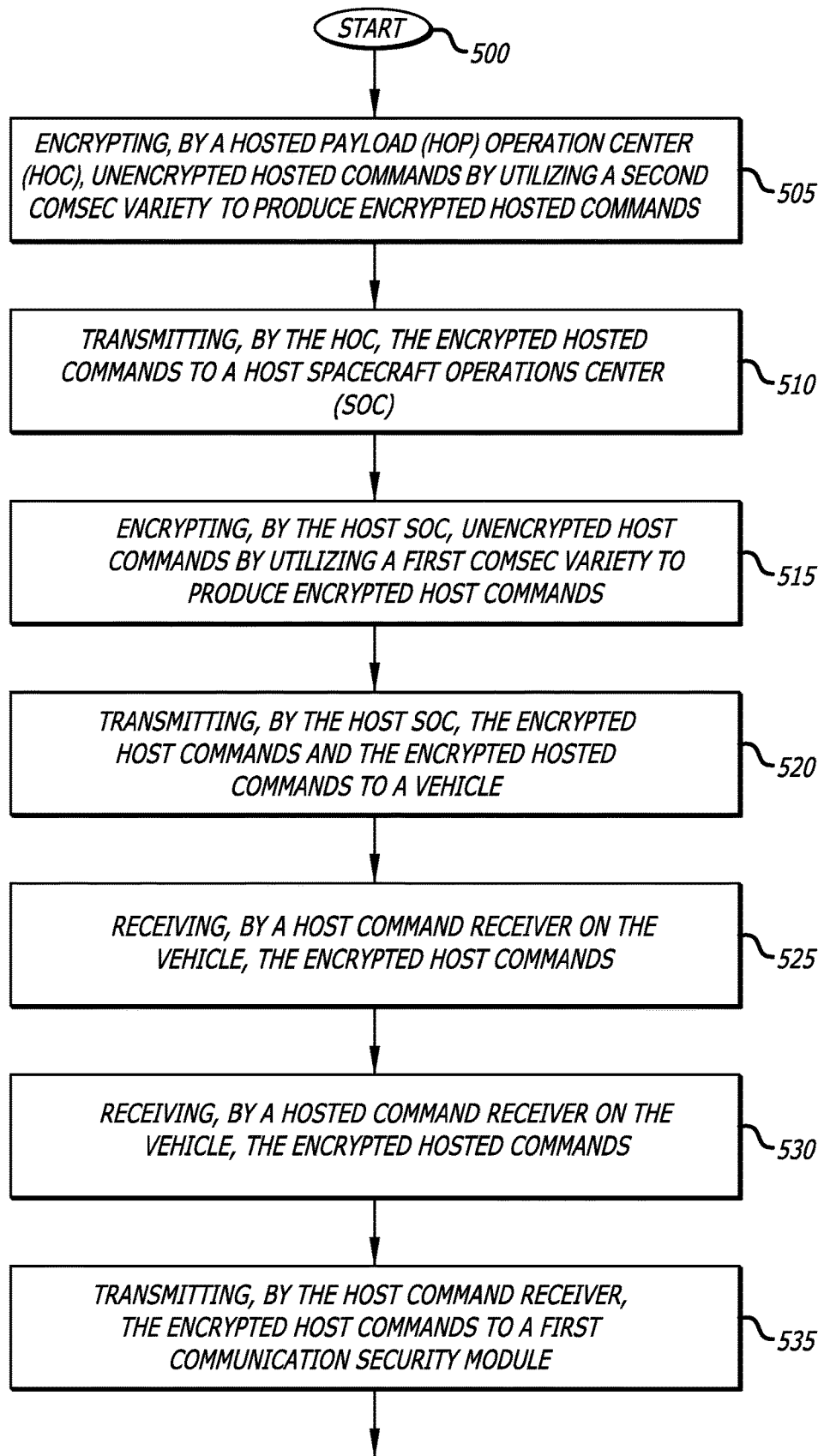
Figure 5B:
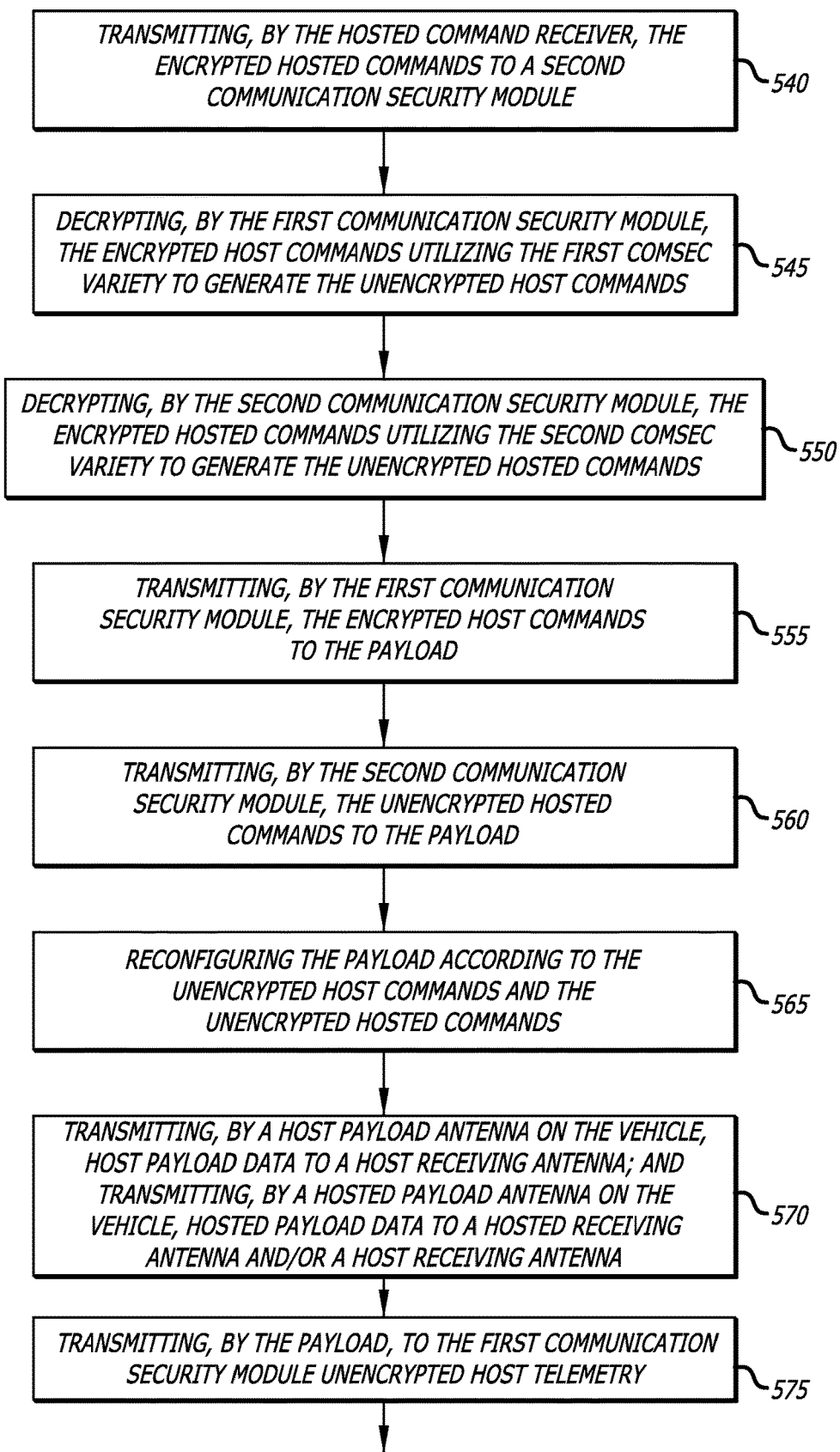
Figure 5C:
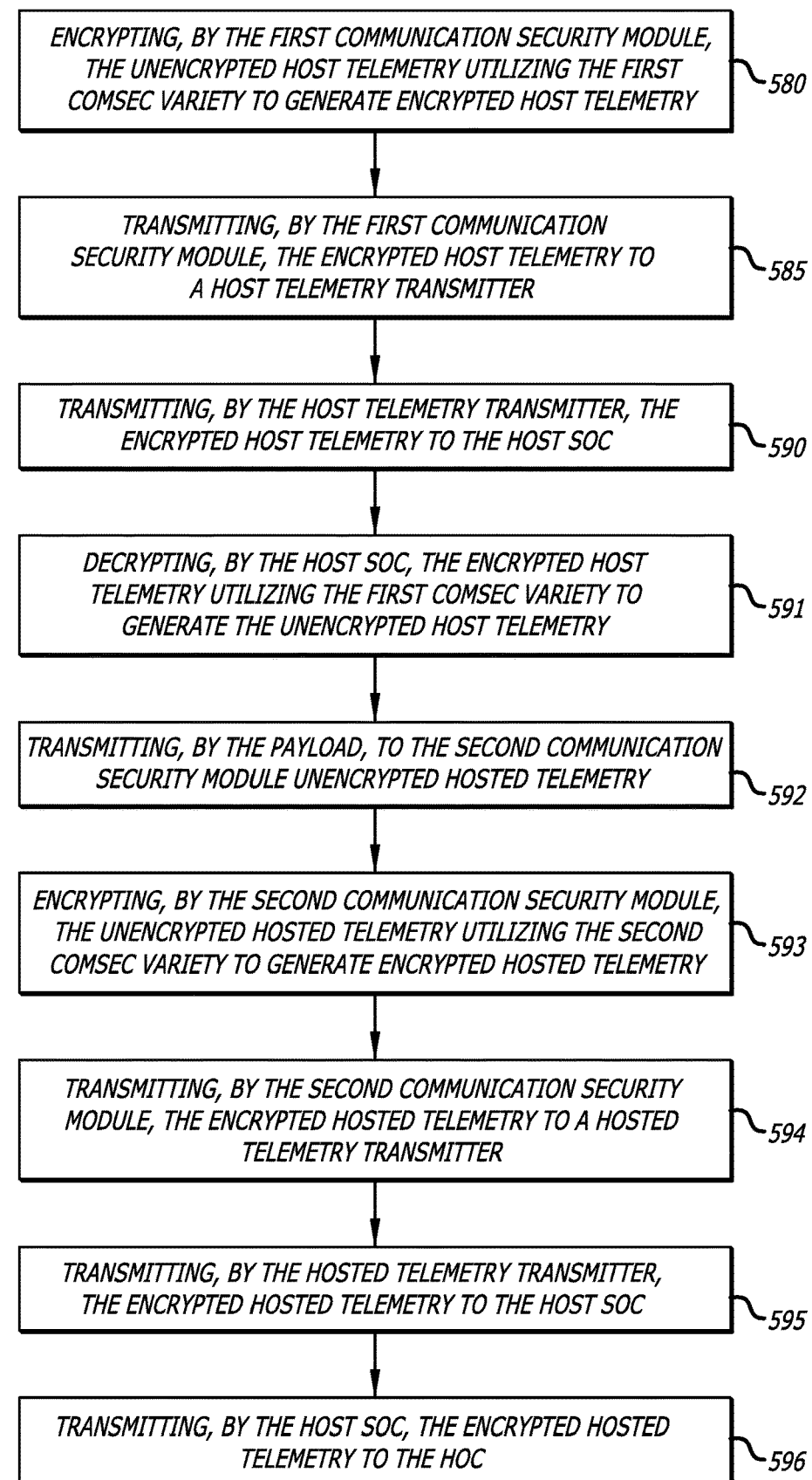
Figure 5D:
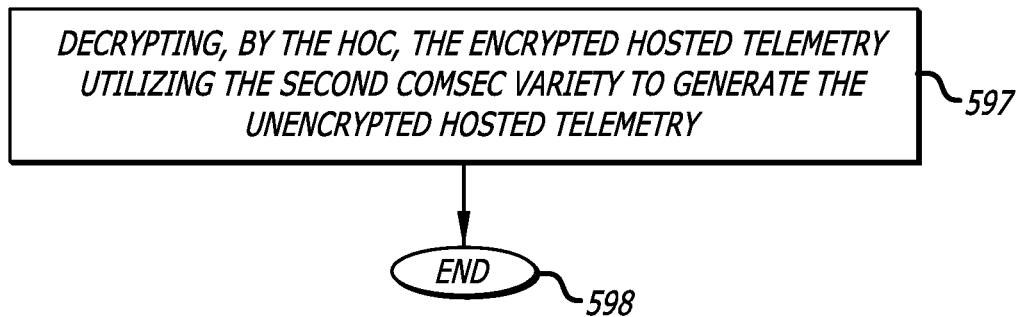

FIG. 4 is a diagram showing the disclosed system for hosted payload operations where the host user transmits encrypted host commands (encrypted utilizing a first COMSEC variety) and encrypted hosted commands (encrypted utilizing a second COMSEC variety) to a vehicle, and where the host telemetry is encrypted using the first COMSEC variety and the hosted telemetry is encrypted using the second COMSEC variety, in accordance with at least one embodiment of the present disclosure.

FIGS. 5A, 5B, 5C, and 5D together show a flow chart for the disclosed method for hosted payload operations where the host user transmits encrypted host commands (encrypted utilizing a first COMSEC variety) and encrypted hosted commands (encrypted utilizing a second COMSEC variety) to a vehicle, and where the host telemetry is encrypted using the first COMSEC variety and the hosted telemetry is encrypted using the second COMSEC variety, in accordance with at least one embodiment of the present disclosure.

Figure 6:
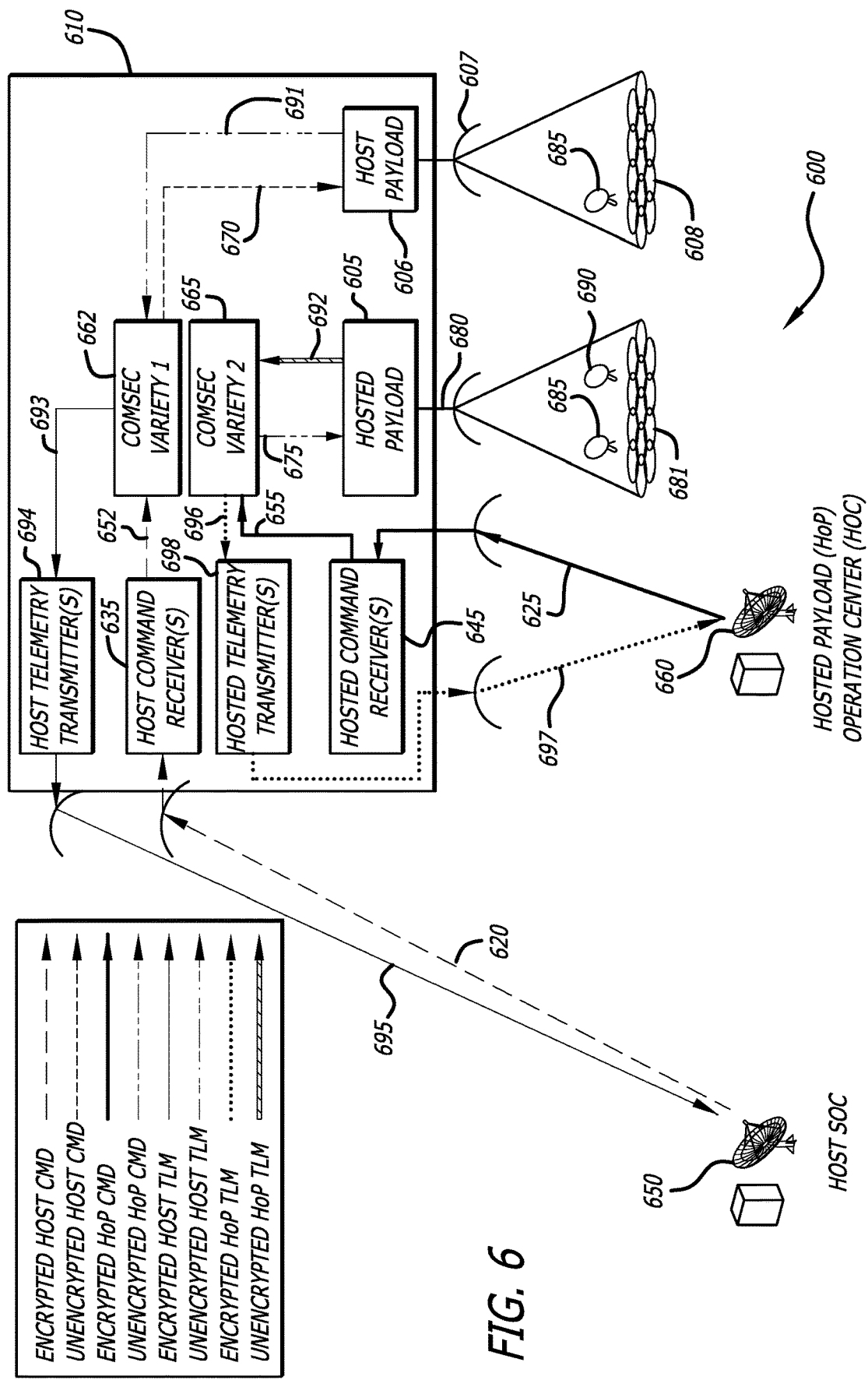

FIG. 6 is a diagram showing the disclosed system for hosted payload operations where the host user transmits encrypted host commands (encrypted utilizing a first COMSEC variety) to a vehicle and the hosted user transmits encrypted hosted commands (encrypted utilizing a second COMSEC variety) to the vehicle, and where the host telemetry is encrypted using the first COMSEC variety and the hosted telemetry is encrypted using the second COMSEC variety, in accordance with at least one embodiment of the present disclosure.

Figure 7A:
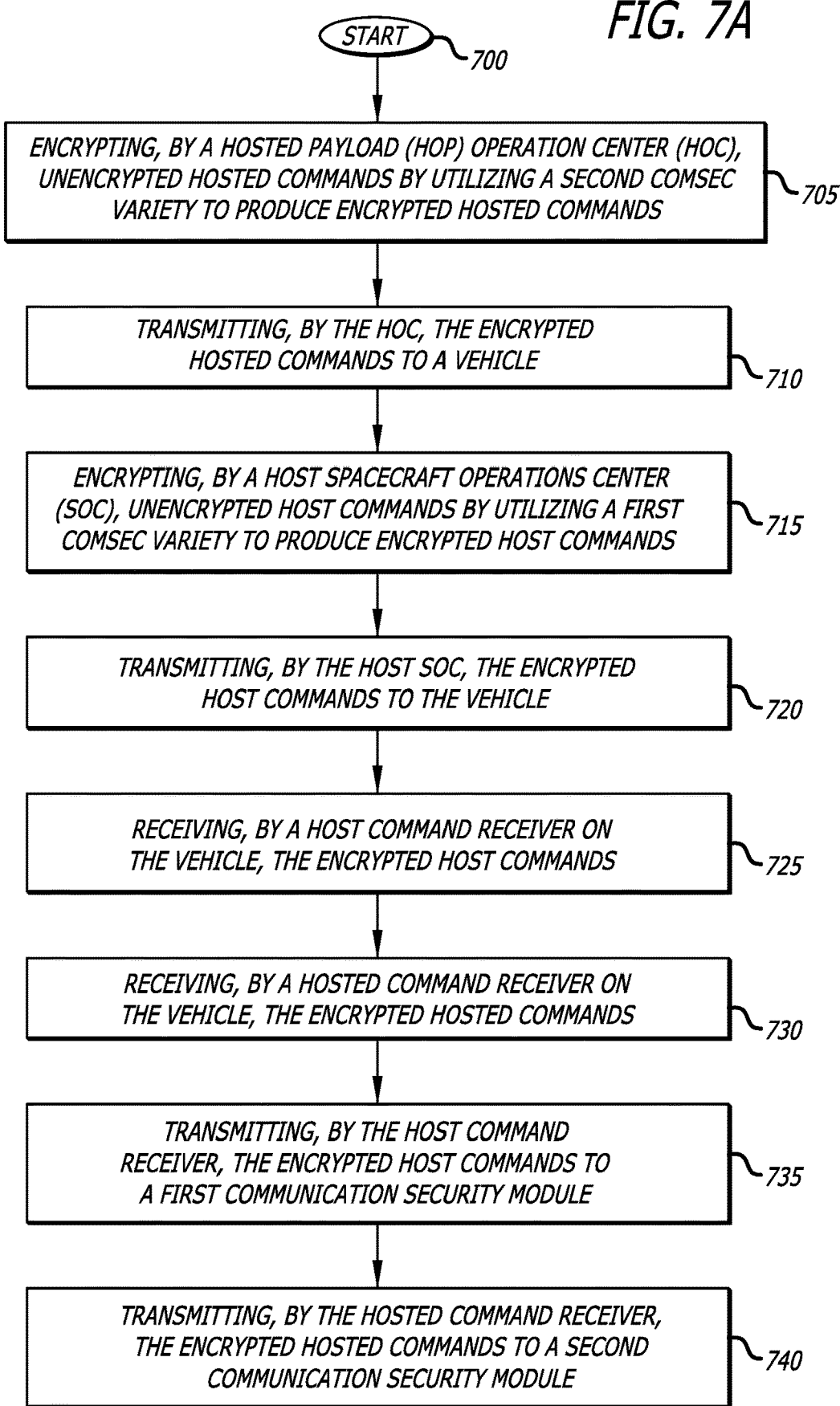
Figure 7B:
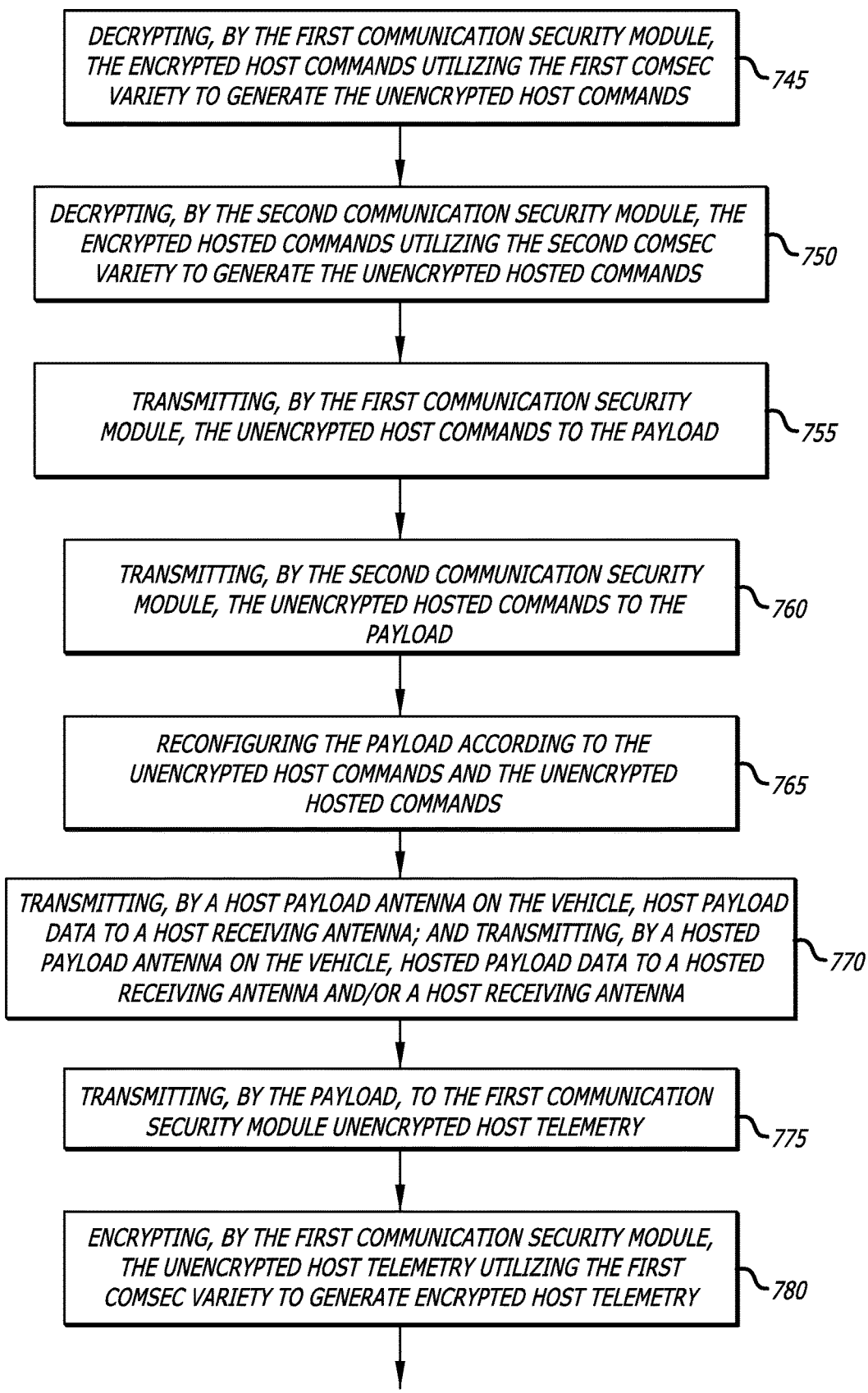

FIGS. 7A, 7B, and 7C together show a flow chart for the disclosed method for hosted payload operations where the host user transmits encrypted host commands (encrypted utilizing a first COMSEC variety) to a vehicle and the hosted user transmits encrypted hosted commands (encrypted utilizing a second COMSEC variety) to the vehicle, and where the host telemetry is encrypted using the first COMSEC variety and the hosted telemetry is encrypted using the second COMSEC variety, in accordance with at least one embodiment of the present disclosure.

DESCRIPTION

The methods and apparatus disclosed herein provide an operative system for hosted payload operations. The system of the present disclosure allows for vehicle operators to privately share vehicle resources.

As previously mentioned above, currently, typical payload operations for a vehicle (e.g., a satellite) have the ability to perform switching of inputs to outputs of the payload on the vehicle. All of this switching on the payload is commanded and controlled by a single satellite controller with no resource allocation privacy.

The disclosed system allows for private vehicle resource allocation and control that provides vehicle users the ability to privately, dynamically, allocate resources (e.g., a host payload and/or a hosted payload) on demand.

It should be noted that the host payload and/or the hosted payload for the disclosed system for private vehicle resource allocation and control may employ various different types of transponders. For example, various different types of transponders may be employed including, but not limited to, various different types of digital transponders, various different types of analog transponders (e.g., conventional repeater-type transponders), and various different types of combination analog/digital transponders.

It should be noted that in this disclosure, inband frequency band(s) refer to a frequency band(s) that is the same frequency band(s) utilized to transmit payload data (e.g., host payload data and/or hosted payload data); and out-of-band frequency band(s) refer to a frequency band(s) that is not the same frequency band(s) utilized to transmit payload data (e.g., host payload data and/or hosted payload data).

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

Embodiments of the present disclosure may be described herein in terms of functional and/or logical components and various processing steps. It should be appreciated that such components may be realized by any number of hardware, software, and/or firmware components configured to perform the specified functions. For example, an embodiment of the present disclosure may employ various integrated circuit components (e.g., memory elements, digital signal processing elements, logic elements, look-up tables, or the like), which may carry out a variety of functions under the control of one or more processors, microprocessors, or other control devices. In addition, those skilled in the art will appreciate that embodiments of the present disclosure may be practiced in conjunction with other components, and that the system described herein is merely one example embodiment of the present disclosure.

For the sake of brevity, conventional techniques and components related to satellite communication systems, and other functional aspects of the system (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

FIG. 1 is a diagram 100 showing simplified architecture for the disclosed system for hosted payload operations, in accordance with at least one embodiment of the present disclosure. In this figure, a simplified view of multiple possible hosted payload configurations is illustrated. In particular, this figure shows a space segment 110 and a ground segment 120. The space segment 110 represents a vehicle. Various different types of vehicles may be employed for the vehicle including, but not limited to, an airborne vehicle. And, various different types of airborne vehicles may be employed for the vehicle including, but not limited to, a satellite, an aircraft, an unmanned aerial vehicle (UAV), and a space plane.

In the case of a satellite being employed for the vehicle, it should be noted that satellites typically include computer-controlled systems. A satellite generally includes a bus 130 and a payload (e.g., a host payload and a hosted payload(s)) 140. The bus 130 may include systems (which include components) that control the satellite. These systems perform tasks, such as power generation and control, thermal control, telemetry, attitude control, orbit control, and other suitable operations.

The payload 140 of the satellite provides functions to users of the satellite. The payload 140 may include antennas, transponders, and other suitable devices. For example, with respect to communications, the payload 140 in a satellite may be used to provide Internet access, telephone communications, radio, television, and other types of communications. It should be noted that, in one or more embodiments, the payload 140 comprises multiple separate payloads, which are a host payload and a hosted payload(s).

The payload 140 of the satellite may be used by different entities. For example, the payload 140 may be used by the host user, the hosted user(s), other customers, or some combination thereof.

For example, the host user may lease different portions of the payload (e.g., the hosted payload(s)) 140 to different customers (e.g., a hosted user(s)). In one example, one group of antenna beams generated by the payload (e.g., hosted payload(s)) 140 of the satellite may be leased to one customer, while a second group of antenna beams may be leased to a second customer. In another example, one group of antenna beams generated by the payload (e.g. the host payload) 140 of the satellite may be utilized by the host user of the satellite, while a second group of antenna beams generated by the payload (e.g. by the hosted payload) 140 may be leased to a customer (e.g., a hosted user). In yet another example, some or all of the antenna beams generated by the payload (e.g. by the hosted payload(s)) 140 of the satellite may be shared by one customer and a second customer. When satellites are shared by different users, users may have a shared communications link (e.g., Interface A) to the satellite, or each user may have a separate communications link (e.g., Interfaces A and D) to the satellite.

Leasing a satellite to multiple customers (e.g., hosted users) may increase the revenues that a user (e.g., the host user) of a satellite can obtain. Further, a customer may use a subset of the total resources in a satellite for a cost that is less than the cost for the customer to purchase and operate a satellite, to build and operate a satellite, or to lease an entire satellite.

Referring back to FIG. 1, the ground segment 120 comprises a host spacecraft operations center (SOC) (e.g., a ground station associated with control of the host payload of the satellite) 150, and a hosted payload (HoP) operation center(s) (HOC(s)) (e.g., a ground station(s) associated with control of the hosted payload of the satellite) 160.

FIG. 1 shows a number of different possible communication links (i.e. Interfaces A-E). It should be noted that the disclosed system may employ some or all of these illustrated communication links. Interface A, which may comprise multiple links, is an out-of-band command and telemetry link from the host SOC 150 to command the satellite. Interface B, which may comprise multiple links, is a communication link, between the bus 130 and the payload 140. Interface B may be used to control essential items, such as power. Information that may be communicated from the bus 130 to the payload 140 via Interface B may include, but is not limited to, time, ephemeris, and payload commands. Information that may be communicated from the payload 140 to the bus 130 via Interface B may include, but is not limited to, payload telemetry.

Interface C, which may comprise multiple links, is an inband command and telemetry link for bus and/or payload. Interface D, which may comprise multiple links, is a command and telemetry link from the HOC(s) 160 to command the satellite. Interface E, which may comprise multiple links, between the host SOC 150 and the HOCs 160.

FIG. 2 is a diagram 200 showing the disclosed system for hosted payload operations where the host user (i.e. the host SOC) 250 transmits encrypted host commands (encrypted utilizing a first COMSEC variety) and encrypted hosted commands (encrypted utilizing the second COMSEC variety) to a vehicle, and where the host telemetry and the hosted telemetry are both encrypted using the first COMSEC variety, in accordance with at least one embodiment of the present disclosure. In this figure, a vehicle 210, a host SOC 250, and a HOC 260 are shown.

During operation, the HOC 260 encrypts unencrypted hosted commands (i.e. unencrypted HoP CMD), by utilizing a second COMSEC variety, to produce encrypted hosted commands (i.e. encrypted HoP CMD). The hosted commands are commands that are used to configure the hosted payload 205 utilized by the HOC 260. The host SOC 250 encrypts unencrypted host commands (i.e. unencrypted host CMD), by utilizing a first COMSEC variety, to produce encrypted host commands (i.e. encrypted host CMD). The host commands are commands that are used to configure the host payload 206 that is utilized by the host SOC 250.

It should be noted that, although in FIG. 2 the host SOC 250 is depicted to have its ground antenna located right next to its operations building; in other embodiments, the host SOC 250 may have its ground antenna located very far away from the its operations building (e.g., the ground antenna may be located in another country than the operations building).

Also, it should be noted that the first COMSEC variety may include at least one encryption key and/or at least one algorithm (e.g., a Type 1 encryption algorithm or a Type 2 encryption algorithm). Additionally, it should be noted that the second COMSEC variety may include at least one encryption key and/or at least one encryption algorithm (e.g., a Type 1 encryption algorithm or a Type 2 encryption algorithm).

The HOC 260 then transmits 215 the encrypted hosted commands to the host SOC 250. After the host SOC 250 receives the encrypted hosted commands, the host SOC 250 transmits 220 the encrypted host commands and transmits 225 the encrypted hosted commands to the vehicle 210. The host SOC 250 transmits 220, 225 the encrypted host commands and the encrypted hosted commands utilizing an out-of-band frequency band(s) (i.e. a frequency band(s) that is not the same frequency band(s) utilized to transmit payload data). The host command receiver 235 on the vehicle 210 receives the encrypted host commands. In addition, the hosted command receiver 245 on the vehicle 210 receives the encrypted hosted commands.

The host command receiver 235 then transmits 252 the encrypted host commands to a first communication security module 262. The first communication security module 262 decrypts the encrypted host commands utilizing the first COMSEC variety (i.e. COMSEC Variety 1) to generate unencrypted host commands.

It should be noted that the first communication security module 262 may comprise one or more modules. In addition, the first communication security module 262 may comprise one or more processors.

The hosted command receiver 245 then transmits 255 the encrypted hosted commands to a second communication security module 265. The second communication security module 265 decrypts the encrypted hosted commands utilizing the second COMSEC variety (i.e. COMSEC Variety 2) to generate unencrypted hosted commands.

It should be noted that the second communication security module 265 may comprise one or more modules. In addition, the second communication security module 265 may comprise one or more processors.

The first communication security module 262 then transmits 270 the unencrypted host commands to the host payload 206. The second communication security module 265 transmits 275 the unencrypted hosted commands to the hosted payload 205. The host payload 206 is reconfigured according to the unencrypted host commands, and the hosted payload 205 is reconfigured according to the unencrypted hosted commands. A host payload antenna 207 then transmits (e.g., in one or more antenna beams 208) host payload data to a host receiving antenna 285 on the ground. A hosted payload antenna 280 then transmits (e.g., in one or more antenna beams 281 and/or 208) hosted payload data to a hosted receiving antenna 290 and/or the host receiving antenna 285 on the ground.

Also, it should be noted that, although in FIG. 2, antenna beams 208, 281 are shown to include a plurality of circular spot beams; in other embodiments, antenna beams 208, 281 may include more or less number of beams than is shown in FIG. 2 (e.g., antenna beams 208, 281 may only include a single beam), and antenna beams 208, 281 may include beams of different shapes than circular spot beams as is shown in FIG. 2 (e.g., antenna beams 208, 281 may include elliptical beams and/or shaped beams of various different shapes).

It should be noted that in one or more embodiments, the host payload antenna 207 and the hosted payload antenna 280 may comprise one or more reflector dishes including, but not limited to, parabolic reflectors and/or shaped reflectors. In some embodiments, the host payload antenna 207 and the hosted payload antenna 280 may comprise one or more multifeed antenna arrays.

The host payload 206 transmits 209 unencrypted host telemetry (i.e. unencrypted host TLM, which is telemetry data related to the payload 206 that is utilized by the host SOC 250) to the first communication security module 262. The hosted payload 205 transmits 291 unencrypted hosted telemetry (i.e. unencrypted HoP TLM, which is telemetry data related to the payload 205 that is utilized by the HOC 260) to the first communication security module 262. The first communication security module 262 then encrypts the unencrypted host telemetry and unencrypted hosted telemetry utilizing the first COMSEC variety to generate encrypted telemetry (i.e. encrypted TLM) (i.e. encrypted host telemetry and encrypted hosted telemetry).

The first communication security module 262 then transmits 293 the encrypted telemetry to a telemetry transmitter 294. The telemetry transmitter 294 then transmits 295 the encrypted telemetry to the host SOC 250. The telemetry transmitter 294 transmits 295 the encrypted telemetry utilizing an out-of-band frequency band(s). The host SOC 250 then decrypts the encrypted telemetry utilizing the first COMSEC variety to generate the unencrypted telemetry. The host SOC 250 then utilizes a database that comprises host payload decommutated information and does not comprise hosted payload decommutated information (i.e. a database without hosted payload decommutated information) to read to unencrypted telemetry to determine the telemetry data related to the portion of the payload 205 that is utilized by the host SOC 250.

The host SOC 250 then transmits 299 the encrypted telemetry to the HOC 260. The HOC 260 then decrypts the encrypted telemetry utilizing the first COMSEC variety to generate the unencrypted telemetry. The HOC 260 then utilizes a database that comprises hosted payload decommutated information and does not comprise host payload decommutated information (i.e. a database without host payload decommutated information) to read to unencrypted telemetry to determine the telemetry data related to the portion of the payload 205 that is utilized by the HOC 260.

FIGS. 3A, 3B, and 3C together show a flow chart for the disclosed method for hosted payload operations where the host user transmits encrypted host commands (encrypted utilizing a first COMSEC variety) and encrypted hosted commands (encrypted utilizing the second COMSEC variety) to a vehicle, and where the host telemetry and the hosted telemetry are both encrypted using the first COMSEC variety, in accordance with at least one embodiment of the present disclosure. At the start 300 of the method, a hosted payload (HoP) operation center (HOC) encrypts unencrypted hosted commands by utilizing a second COMSEC variety to produce encrypted hosted commands 305. Then, the HOC transmits the encrypted hosted commands to a host spacecraft operations center (SOC) 310. The host SOC encrypts unencrypted host commands by utilizing a first COMSEC variety to produce encrypted host commands 315. Then, the host SOC transmits (out-of-band) the encrypted host commands and the encrypted hosted commands to a vehicle 320.

Then, a host command receiver on the vehicle receives the encrypted host commands 325. And, a hosted command receiver on the vehicle receives the encrypted hosted commands 330. The host command receiver transmits the encrypted host commands to a first communication security module 335. The hosted command receiver transmits the encrypted hosted commands to a second communication security module 340. The first communication security module then decrypts the encrypted host commands utilizing the first COMSEC variety to generate the unencrypted host commands 345. The second communication security module then decrypts the encrypted hosted commands utilizing the second COMSEC variety to generate the unencrypted hosted commands 350.

The first communication security module then transmits the unencrypted host commands to the host payload 355. The second communication security module then transmits the unencrypted hosted commands to the hosted payload 360. Then, the host payload is reconfigured according to the unencrypted host commands, and the hosted payload is reconfigured according to the unencrypted hosted commands 365. A host payload antenna on the vehicle then transmits host payload data to a host receiving antenna, and a hosted payload antenna on the vehicle then transmits hosted payload data to a hosted receiving antenna and/or the host receiving antenna 370.

Then, the host payload transmits to the first communication security module unencrypted host telemetry, and the hosted payload transmits to the first communication security module unencrypted hosted telemetry 375. Then, the first communication security module encrypts the unencrypted host telemetry and the unencrypted hosted telemetry utilizing the first COMSEC variety to generate encrypted host telemetry and encrypted hosted telemetry 380. The first communication security module then transmits the encrypted host telemetry and the encrypted hosted telemetry to a telemetry transmitter 385. Then, the telemetry transmitter transmits the encrypted host telemetry and the encrypted hosted telemetry to the host SOC 390. The host SOC then decrypts the encrypted host telemetry utilizing the first COMSEC variety to generate the unencrypted host telemetry 395.

The host SOC transmits the encrypted hosted telemetry to the HOC 396. Then, the HOC decrypts the encrypted hosted telemetry utilizing the first COMSEC variety to generate the unencrypted hosted telemetry 397. Then, the method ends 398.

FIG. 4 is a diagram 400 showing the disclosed system for hosted payload operations where the host user (i.e. the host SOC) 450 transmits encrypted host commands (encrypted utilizing a first COMSEC variety) and encrypted hosted commands (encrypted utilizing a second COMSEC variety) to a vehicle, and where the host telemetry is encrypted using the first COMSEC variety and the hosted telemetry is encrypted using the second COMSEC variety, in accordance with at least one embodiment of the present disclosure. In this figure, a vehicle 410, a host SOC 450, and a HOC 460 are shown.

During operation, the HOC 460 encrypts unencrypted hosted commands (i.e. unencrypted HoP CMD), by utilizing a second COMSEC variety, to produce encrypted hosted commands (i.e. encrypted HoP CMD). The hosted commands are commands that are used to configure the hosted payload 405 utilized by the HOC 460. The host SOC 450 encrypts unencrypted host commands (i.e. unencrypted host CMD), by utilizing a first COMSEC variety, to produce encrypted host commands (i.e. encrypted host CMD). The host commands are commands that are used to configure the host payload 406 that is utilized by the host SOC 450.

It should be noted that, although in FIG. 4 the host SOC 450 is depicted to have its ground antenna located right next to its operations building; in other embodiments, the host SOC 450 may have its ground antenna located very far away from the its operations building (e.g., the ground antenna may be located in another country than the operations building).

Also, it should be noted that the first COMSEC variety may include at least one encryption key and/or at least one algorithm (e.g., a Type 1 encryption algorithm or a Type 2 encryption algorithm). Additionally, it should be noted that the second COMSEC variety may include at least one encryption key and/or at least one encryption algorithm (e.g., a Type 1 encryption algorithm or a Type 2 encryption algorithm).

The HOC 460 then transmits 415 the encrypted hosted commands to the host SOC 450. After the host SOC 450 receives the encrypted hosted commands, the host SOC 450 transmits 420 the encrypted host commands and transmits 425 the encrypted hosted commands to the vehicle 410. The host SOC 450 transmits 420, 425 the encrypted host commands and the encrypted hosted commands utilizing an out-of-band frequency band(s) (i.e. a frequency band(s) that is not the same frequency band(s) utilized to transmit payload data). The host command receiver 435 on the vehicle 410 receives the encrypted host commands. In addition, the hosted command receiver 445 on the vehicle 410 receives the encrypted hosted commands.

The host command receiver 435 then transmits 452 the encrypted host commands to a first communication security module 462. The first communication security module 462 decrypts the encrypted host commands utilizing the first COMSEC variety (i.e. COMSEC Variety 1) to generate unencrypted host commands.

It should be noted that the first communication security module 462 may comprise one or more modules. In addition, the first communication security module 462 may comprise one or more processors.

The hosted command receiver 445 then transmits 455 the encrypted hosted commands to a second communication security module 465. The second communication security module 465 decrypts the encrypted hosted commands utilizing the second COMSEC variety (i.e. COMSEC Variety 2) to generate unencrypted hosted commands.

It should be noted that the second communication security module 465 may comprise one or more modules. In addition, the second communication security module 465 may comprise one or more processors.

The first communication security module 462 then transmits 470 the unencrypted host commands to the host payload 406. The second communication security module 465 transmits 475 the unencrypted hosted commands to the hosted payload 405. The host payload 406 is reconfigured according to the unencrypted host commands, and the hosted payload 405 is reconfigured according to the unencrypted hosted commands. A host payload antenna 407 then transmits (e.g., in one or more antenna beams 408) host payload data to a host receiving antenna 485 on the ground. A hosted payload antenna 480 then transmits (e.g., in one or more antenna beams 481 and/or 408) hosted payload data to a hosted receiving antenna 490 and/or the host receiving antenna 485 on the ground.

Also, it should be noted that, although in FIG. 4, antenna beams 408, 481 is shown to include a plurality of circular spot beams; in other embodiments, antenna beams 408, 481 may include more or less number of beams than is shown in FIG. 4 (e.g., antenna beams 408, 481 may only include a single beam), and antenna beams 408, 481 may include beams of different shapes than circular spot beams as is shown in FIG. 4 (e.g., antenna beams 408, 481 may include elliptical beams and/or shaped beams of various different shapes).

It should be noted that in one or more embodiments, the host payload antenna 407 and the hosted payload antenna 480 may comprise one or more reflector dishes including, but not limited to, parabolic reflectors and/or shaped reflectors. In some embodiments, the host payload antenna 407 and the hosted payload antenna 480 may comprise one or more multifeed antenna arrays.

The host payload 406 transmits 491 unencrypted host telemetry (i.e. unencrypted host TLM, which is telemetry data related to the host payload 406 that is utilized by the host SOC 450) to the first communication security module 462. The first communication security module 462 then encrypts the unencrypted host telemetry utilizing the first COMSEC variety to generate encrypted host telemetry (i.e. encrypted host TLM).

The hosted payload 405 transmits 492 unencrypted hosted telemetry (i.e. unencrypted HoP TLM, which is telemetry data related to the payload 405 that is utilized by the HOC 460) to the second communication security module 465. The second communication security module 465 then encrypts the unencrypted hosted telemetry utilizing the second COMSEC variety to generate encrypted hosted telemetry (i.e. encrypted HoP TLM).

The first communication security module 462 then transmits 493 the encrypted host telemetry to a host telemetry transmitter 494. The host telemetry transmitter 494 then transmits 495 the encrypted host telemetry to the host SOC 450. The telemetry transmitter 494 transmits 495 the encrypted host telemetry utilizing an out-of-band frequency band(s). The host SOC 450 then decrypts the encrypted host telemetry utilizing the first COMSEC variety to generate the unencrypted host telemetry.

The second communication security module 465 then transmits 496 the encrypted hosted telemetry to a hosted telemetry transmitter 498. The hosted telemetry transmitter 498 then transmits 497 the encrypted hosted telemetry to the host SOC 450. The telemetry transmitter 498 transmits 497 the encrypted hosted telemetry utilizing an out-of-band frequency band(s). The host SOC 450 then transmits 499 the encrypted hosted telemetry to the HOC 460. The HOC 460 then decrypts the encrypted hosted telemetry utilizing the second COMSEC variety to generate the unencrypted hosted telemetry.

FIGS. 5A, 5B, 5C, and 5D together show a flow chart for the disclosed method for hosted payload operations where the host user transmits encrypted host commands (encrypted utilizing a first COMSEC variety) and encrypted hosted commands (encrypted utilizing a second COMSEC variety) to a vehicle, and where the host telemetry is encrypted using the first COMSEC variety and the hosted telemetry is encrypted using the second COMSEC variety, in accordance with at least one embodiment of the present disclosure. At the start 500 of the method, a hosted payload (HoP) operation center (HOC) encrypts unencrypted hosted commands by utilizing a second COMSEC variety to produce encrypted hosted commands 505. Then, the HOC transmits the encrypted hosted commands to a host spacecraft operations center (SOC) 510. The host SOC encrypts unencrypted host commands by utilizing a first COMSEC variety to produce encrypted host commands 515. Then, the host SOC transmits (out-of-band) the encrypted host commands and the encrypted hosted commands to a vehicle 520.

Then, a host command receiver on the vehicle receives the encrypted host commands 525. And, a hosted command receiver on the vehicle receives the encrypted hosted commands 530. The host command receiver transmits the encrypted host commands to a first communication security module 535. The hosted command receiver transmits the encrypted hosted commands to a second communication security module 540. The first communication security module then decrypts the encrypted host commands utilizing the first COMSEC variety to generate the unencrypted host commands 545. The second communication security module then decrypts the encrypted hosted commands utilizing the second COMSEC variety to generate the unencrypted hosted commands 550.

The first communication security module then transmits the unencrypted host commands to the host payload 555. The second communication security module then transmits the unencrypted hosted commands to the hosted payload 560. Then, the host payload is reconfigured according to the unencrypted host commands, and the hosted payload is reconfigured according to the unencrypted hosted commands 565. A host payload antenna on the vehicle then transmits host payload data to a host receiving antenna, and a hosted payload antenna on the vehicle then transmits hosted payload data to a hosted receiving antenna and/or the host receiving antenna 570.

Then, the host payload transmits to the first communication security module unencrypted host telemetry 575. The first communication security module then encrypts the unencrypted host telemetry utilizing the first COMSEC variety to generate encrypted host telemetry 580. Then, the first communication security module transmits the encrypted host telemetry to a host telemetry transmitter 585. The host telemetry transmitter then transmits the encrypted host telemetry to the host SOC 590. Then, the host SOC decrypts the encrypted host telemetry utilizing the first COMSEC variety to generate the unencrypted host telemetry 591.

The hosted payload transmits to the second communication security module unencrypted hosted telemetry 592. Then, the second communication security module encrypts the unencrypted hosted telemetry utilizing the second COMSEC variety to generate encrypted hosted telemetry 593. The second communication security module then transmits the encrypted hosted telemetry to a hosted telemetry transmitter

594. Then, the hosted telemetry transmitter transmits the encrypted hosted telemetry to the host SOC 595. The host SOC then transmits the encrypted hosted telemetry to the HOC 596. Then the HOC decrypts the encrypted hosted telemetry utilizing the second COMSEC variety to generate the unencrypted hosted telemetry 597. Then, the method ends 598.

FIG. 6 is a diagram 600 showing the disclosed system for hosted payload operations where the host user (i.e. the host SOC) 650 transmits encrypted host commands (encrypted utilizing a first COMSEC variety) to a vehicle and the hosted user (i.e. the HOC) 660 transmits encrypted hosted commands (encrypted utilizing a second COMSEC variety) to the vehicle, and where the host telemetry is encrypted using the first COMSEC variety and the hosted telemetry is encrypted using the second COMSEC variety, in accordance with at least one embodiment of the present disclosure. In this figure, a vehicle 610, a host SOC 650, and a HOC 660 are shown.

During operation, the HOC 660 encrypts unencrypted hosted commands (i.e. unencrypted HoP CMD), by utilizing a second COMSEC variety, to produce encrypted hosted commands (i.e. encrypted HoP CMD). The hosted commands are commands that are used to configure the hosted payload 605 utilized by the HOC 660. The host SOC 650 encrypts unencrypted host commands (i.e. unencrypted host CMD), by utilizing a first COMSEC variety, to produce encrypted host commands (i.e. encrypted host CMD). The host commands are commands that are used to configure the host payload 606 utilized by the host SOC 650.

It should be noted that, although in FIG. 6 the host SOC 650 is depicted to have its ground antenna located right next to its operations building; in other embodiments, the host SOC 650 may have its ground antenna located very far away from the its operations building (e.g., the ground antenna may be located in another country than the operations building).

Also, it should be noted that the first COMSEC variety may include at least one encryption key and/or at least one algorithm (e.g., a Type 1 encryption algorithm or a Type 2 encryption algorithm). Additionally, it should be noted that the second COMSEC variety may include at least one encryption key and/or at least one encryption algorithm (e.g., a Type 1 encryption algorithm or a Type 2 encryption algorithm).

The host SOC 650 transmits 620 the encrypted host commands to the vehicle 610. The host SOC 650 transmits 620 the encrypted host commands utilizing an out-of-band frequency band(s) (i.e. a frequency band(s) that is not the same frequency band(s) utilized to transmit payload data).

The HOC 660 transmits 625 the encrypted hosted commands to the vehicle 610. The HOC 660 transmits 625 the encrypted hosted commands utilizing an out-of-band frequency band(s).

The host command receiver 635 on the vehicle 610 receives the encrypted host commands. In addition, the hosted command receiver 645 on the vehicle 610 receives the encrypted hosted commands.

The host command receiver 635 then transmits 652 the encrypted host commands to a first communication security module 662. The first communication security module 662 decrypts the encrypted host commands utilizing the first COMSEC variety (i.e. COMSEC Variety 1) to generate unencrypted host commands.

It should be noted that the first communication security module 662 may comprise one or more modules. In addition, the first communication security module 662 may comprise one or more processors.

The hosted command receiver 645 then transmits 655 the encrypted hosted commands to a second communication security module 665. The second communication security module 665 decrypts the encrypted hosted commands utilizing the second COMSEC variety (i.e. COMSEC Variety 2) to generate unencrypted hosted commands.

It should be noted that the second communication security module 665 may comprise one or more modules. In addition, the second communication security module 665 may comprise one or more processors.

The first communication security module 662 then transmits 670 the unencrypted host commands to the host payload 606. The second communication security module 665 transmits 675 the unencrypted hosted commands to the hosted payload 605. The host payload 606 is reconfigured according to the unencrypted host commands, and the hosted payload 605 is reconfigured according to the unencrypted hosted commands. A host payload antenna 607 then transmits (e.g., in one or more antenna beams 608) host payload data to a host receiving antenna 685 on the ground. A hosted payload antenna 680 then transmits (e.g., in one or more antenna beams 681 and/or 608) hosted payload data to a hosted receiving antenna 690 and/or a host receiving antenna 685 on the ground.

Also, it should be noted that, although in FIG. 6, antenna beams 608, 681 is shown to include a plurality of circular spot beams; in other embodiments, antenna beams 608, 681 may include more or less number of beams than is shown in FIG. 6 (e.g., antenna beams 608, 681 may only include a single beam), and antenna beams 608, 681 may include beams of different shapes than circular spot beams as is shown in FIG. 6 (e.g., antenna beams 608, 681 may include elliptical beams and/or shaped beams of various different shapes).

It should be noted that in one or more embodiments, the host payload antenna 607 and the hosted payload antenna 680 may comprise one or more reflector dishes including, but not limited to, parabolic reflectors and/or shaped reflectors. In some embodiments, the host payload antenna 607 and the hosted payload antenna 680 may comprise one or more multifeed antenna arrays.

The host payload 606 transmits 691 unencrypted host telemetry (i.e. unencrypted host TLM, which is telemetry data related to the payload 606 that is utilized by the host SOC 650) to the first communication security module 662. The first communication security module 662 then encrypts the unencrypted host telemetry utilizing the first COMSEC variety to generate encrypted host telemetry (i.e. encrypted host TLM).

The hosted payload 605 transmits 692 unencrypted hosted telemetry (i.e. unencrypted HoP TLM, which is telemetry data related to the payload 605 that is utilized by the HOC 660) to the second communication security module 665. The second communication security module 665 then encrypts the unencrypted hosted telemetry utilizing the second COMSEC variety to generate encrypted hosted telemetry (i.e. encrypted HoP TLM).

The first communication security module 662 then transmits 693 the encrypted host telemetry to a host telemetry transmitter 694. The host telemetry transmitter 694 then transmits 695 the encrypted host telemetry to the host SOC 650. The telemetry transmitter 694 transmits 695 the encrypted host telemetry utilizing an out-of-band frequency band(s). The host SOC 650 then decrypts the encrypted host telemetry utilizing the first COMSEC variety to generate the unencrypted host telemetry.

The second communication security module 665 then transmits 696 the encrypted hosted telemetry to a hosted telemetry transmitter 698. The hosted telemetry transmitter 698 then transmits 697 the encrypted hosted telemetry to the HOC 660. The telemetry transmitter 698 transmits 697 the encrypted hosted telemetry utilizing an out-of-band frequency band(s). The HOC 660 then decrypts the encrypted hosted telemetry utilizing the second COMSEC variety to generate the unencrypted hosted telemetry.

FIGS. 7A, 7B, and 7C together show a flow chart for the disclosed method for hosted payload operations where the host user transmits encrypted host commands (encrypted utilizing a first COMSEC variety) to a vehicle and the hosted user transmits encrypted hosted commands (encrypted utilizing a second COMSEC variety) to the vehicle, and where the host telemetry is encrypted using the first COMSEC variety and the hosted telemetry is encrypted using the second COMSEC variety, in accordance with at least one embodiment of the present disclosure. At the start 700 of the method, a hosted payload (HoP) operation center (HOC) encrypts unencrypted hosted commands by utilizing a second COMSEC variety to produce encrypted hosted commands 705. Then, the HOC transmits (out-of-band) the encrypted hosted commands to a vehicle 710. The host spacecraft operations center (SOC) encrypts unencrypted host commands by utilizing a first COMSEC variety to produce encrypted host commands 715. Then, the host SOC transmits (out-of-band) the encrypted host commands to the vehicle 720.

Then, a host command receiver on the vehicle receives the encrypted host commands 725. And, a hosted command receiver on the vehicle receives the encrypted hosted commands 730. The host command receiver transmits the encrypted host commands to a first communication security module 735. The hosted command receiver transmits the encrypted hosted commands to a second communication security module 740. The first communication security module then decrypts the encrypted host commands utilizing the first COMSEC variety to generate the unencrypted host commands 745. The second communication security module then decrypts the encrypted hosted commands utilizing the second COMSEC variety to generate the unencrypted hosted commands 750.

The first communication security module then transmits the unencrypted host commands to the host payload 755. The second communication security module then transmits the unencrypted hosted commands to the hosted payload 760. Then, the host payload is reconfigured according to the unencrypted host commands and, the hosted payload is reconfigured according to the unencrypted hosted command 765. A host payload antenna on the vehicle then transmits host payload data to a host receiving antenna and, a hosted payload antenna on the vehicle then transmits hosted payload data to a hosted receiving antenna and/or the host receiving antenna 770.

Then, the host payload transmits to the first communication security module unencrypted host telemetry 775. Then, the first communication security module encrypts the unencrypted host telemetry utilizing the first COMSEC variety to generate encrypted host telemetry 780. The first communication security module then transmits the encrypted host telemetry to a host telemetry transmitter 785. Then, the host telemetry transmitter transmits the encrypted host telemetry to the host SOC 790. Then, the host SOC decrypts the encrypted host telemetry utilizing the first COMSEC variety to generate the unencrypted host telemetry 791.

The hosted payload transmits to the second communication security module unencrypted hosted telemetry 792. Then, the second communication security module encrypts the unencrypted hosted telemetry utilizing the second COMSEC variety to generate encrypted hosted telemetry 793. The second communication security module then transmits the encrypted hosted telemetry to a hosted telemetry transmitter 794. Then, the hosted telemetry transmitter transmits the encrypted hosted telemetry to the HOC 795. The HOC then decrypts the encrypted hosted telemetry utilizing the second COMSEC variety to generate the unencrypted hosted telemetry 796. Then, the method ends 797.

Although particular embodiments have been shown and described, it should be understood that the above discussion is not intended to limit the scope of these embodiments. While embodiments and variations of the many aspects of the present disclosure have been disclosed and described herein, such disclosure is provided for purposes of explanation and illustration only. Thus, various changes and modifications may be made without departing from the scope of the claims.

Where methods described above indicate certain events occurring in certain order, those of ordinary skill in the art having the benefit of this disclosure would recognize that the ordering may be modified and that such modifications are in accordance with the variations of the present disclosure. Additionally, parts of methods may be performed concurrently in a parallel process when possible, as well as performed sequentially. In addition, more parts or less part of the methods may be performed.

Accordingly, embodiments are intended to exemplify alternatives, modifications, and equivalents that may fall within the scope of the claims.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

We claim:

1. A method for hosted payload operations, the method comprising:

transmitting, by a hosted payload (HoP) operation center (HOC), encrypted hosted commands to a host spacecraft operations center (SOC);

transmitting, by the host SOC, encrypted host commands and the encrypted hosted commands to a vehicle, wherein the encrypted host commands are encrypted utilizing a first communication security (COMSEC) variety and the encrypted hosted commands are encrypted utilizing a second COMSEC variety;

decrypting, by a first communication security module on the vehicle, the encrypted host commands utilizing the first COMSEC variety to generate unencrypted host commands;

decrypting, by a second communication security module on the vehicle, the encrypted hosted commands utilizing the second COMSEC variety to generate unencrypted hosted commands;

reconfiguring a host payload on the vehicle according to the unencrypted host commands;

reconfiguring a hosted payload on the vehicle according to the unencrypted hosted commands;
transmitting, by a host payload antenna on the vehicle, host payload data to a host receiving antenna;
transmitting, by a hosted payload antenna on the vehicle, hosted payload data to at least one of a hosted receiving antenna or the host receiving antenna;
encrypting, by the first communication security module, unencrypted host telemetry from the host payload and unencrypted hosted telemetry from the hosted payload by utilizing the first COMSEC variety to generate encrypted host telemetry and encrypted hosted telemetry;
transmitting, by a telemetry transmitter on the vehicle, the encrypted host telemetry and the encrypted hosted telemetry to the host SOC;
decrypting, by the host SOC, the encrypted host telemetry utilizing the first COMSEC variety and utilizing a database without hosted decommutated information to generate the unencrypted host telemetry;
transmitting, by the host SOC, the encrypted hosted telemetry to the HOC; and
decrypting, by the HOC, the encrypted hosted telemetry utilizing the first COMSEC variety and utilizing a database without host decommutated information to generate the unencrypted hosted telemetry.

2. The method of claim 1, wherein the reconfiguring of the host payload according to the unencrypted host commands and the reconfiguring of the hosted payload according to the unencrypted hosted commands comprises adjusting at least one of: transponder power, transponder spectrum monitoring, transponder connectivity, transponder gain settings, transponder limiter settings, transponder automatic level control settings, transponder phase settings, internal gain generation, bandwidth for at least one beam, at least one frequency band for at least one of the at least one beam, transponder beamforming settings, effective isotropic radiation power (EIRP) for at least one of the at least one beam, transponder channels, or beam steering.

3. The method of claim 1, wherein the reconfiguring of the host payload according to the unencrypted host commands and the reconfiguring of the hosted payload according to the unencrypted hosted commands comprises reconfiguring at least one of: at least one antenna, at least one analog-to-digital converter, at least one digital-to-analog converter, at least one beamformer, at least one digital channelizer, at least one demodulator, at least one modulator, at least one digital switch matrix, or at least one digital combiner.

4. The method of claim 1, wherein the vehicle is an airborne vehicle.

5. The method of claim 4, wherein the airborne vehicle is one of a satellite, aircraft, unmanned aerial vehicle (UAV), or space plane.

6. The method of claim 1, wherein the method further comprises:
encrypting, by the HOC, the unencrypted hosted commands by utilizing the second COMSEC variety to produce the encrypted hosted commands; and
encrypting, by the host SOC, the unencrypted host commands by utilizing the first COMSEC variety to produce the encrypted host commands.

7. The method of claim 1, wherein the method further comprises:
receiving, by a host command receiver on the vehicle, the encrypted host commands;
receiving, by a hosted command receiver on the vehicle, the encrypted hosted commands;
transmitting, by the host command receiver, the encrypted host commands to the first communication security module; and
transmitting, by the hosted command receiver, the encrypted hosted commands to the second communication security module.

8. The method of claim 1, wherein the method further comprises:
transmitting, by the first communication security module, the unencrypted host commands to the host payload; and
transmitting, by the second communication security module, the unencrypted hosted commands to the hosted payload.

9. The method of claim 1, wherein the method further comprises transmitting, by the host payload, to the first communication security module the unencrypted host telemetry; and
transmitting, by the hosted payload, to the first communication security module the unencrypted hosted telemetry.

10. The method of claim 1, wherein the method further comprises transmitting, by the first communication security module, the encrypted host telemetry and the encrypted hosted telemetry to the telemetry transmitter.

11. A system for hosted payload operations, the system comprising:
a hosted payload (HoP) operation center (HOC) to transmit encrypted hosted commands to a host spacecraft operations center (SOC);
the host SOC to transmit encrypted host commands and the encrypted hosted commands to a vehicle,
wherein the encrypted host commands are encrypted utilizing a first communication security (COMSEC) variety and the encrypted hosted commands are encrypted utilizing a second COMSEC variety;
a first communication security module on the vehicle to decrypt the encrypted host commands utilizing the first COMSEC variety to generate unencrypted host commands;
a second communication security module on the vehicle to decrypt the encrypted hosted commands utilizing the second COMSEC variety to generate unencrypted hosted commands;
a host payload on the vehicle reconfigured according to the unencrypted host commands;
a hosted payload on the vehicle reconfigured according to the unencrypted hosted commands;
a host payload antenna on the vehicle to transmit host payload data to a host receiving antenna;
a hosted payload antenna on the vehicle to transmit hosted payload data to at least one of a hosted receiving antenna or the host receiving antenna;
the first communication security module to encrypt unencrypted host telemetry from the host payload and the unencrypted hosted telemetry from the hosted payload by utilizing the first COMSEC variety to generate encrypted host telemetry and encrypted hosted telemetry;
a telemetry transmitter on the vehicle to transmit the encrypted host telemetry and the encrypted hosted telemetry to the host SOC; and
the host SOC to transmit the encrypted hosted telemetry to the HOC,
wherein the host SOC is further to decrypt the encrypted host telemetry utilizing the first COMSEC variety and utilizing a database without hosted decommutated information to generate the unencrypted host telemetry; and the HOC is further to decrypt the encrypted hosted telemetry utilizing the first COMSEC variety and utilizing a database without host decommutated information to generate the unencrypted hosted telemetry.

12. The system of claim 11, wherein the host payload is reconfigured according to the unencrypted host commands and hosted payload is reconfigured according to the unencrypted hosted commands by adjusting at least one of: transponder power, transponder spectrum monitoring, transponder connectivity, transponder gain settings, transponder limiter settings, transponder automatic level control settings, transponder phase settings, internal gain generation, bandwidth for at least one beam, at least one frequency band for at least one of the at least one beam, transponder beamforming settings, effective isotropic radiation power (EIRP) for at least one of the at least one beam, transponder channels, or beam steering.

13. The system of claim 11, wherein the host payload is reconfigured according to the unencrypted host commands and the hosted payload is reconfigured according to the unencrypted hosted commands by reconfiguring at least one of: at least one antenna, at least one analog-to-digital converter, at least one digital-to-analog converter, at least one beamformer, at least one digital channelizer, at least one demodulator, at least one modulator, at least one digital switch matrix, or at least one digital combiner.

14. The system of claim 11, wherein the vehicle is an airborne vehicle.

15. The system of claim 14, wherein the airborne vehicle is one of a satellite, aircraft, unmanned aerial vehicle (UAV), or space plane.

16. The system of claim 11, wherein the HOC is further to encrypt the unencrypted hosted commands by utilizing the second COMSEC variety to produce the encrypted hosted commands, and the host SOC is further to encrypt the unencrypted host commands by utilizing the first COMSEC variety to produce the encrypted host commands.

17. The system of claim 11, wherein the system further comprises:
a host command receiver on the vehicle to receive the encrypted host commands, and to transmit the encrypted host commands to the first communication security module; and
a hosted command receiver on the vehicle to receive the encrypted hosted commands, and to transmit the encrypted hosted commands to the second communication security module.

18. The system of claim 11, wherein the first communication security module is further to transmit the unencrypted host commands to the host payload; and the second communication security module is further to transmit the unencrypted hosted commands to the hosted payload.

19. The system of claim 11, wherein the host payload is further to transmit the unencrypted host telemetry to the first communication security module; and the hosted payload is further to transmit the unencrypted hosted telemetry to the first communication security module.

20. The system of claim 11, wherein the first communication security module is further to transmit the encrypted host telemetry and the encrypted hosted telemetry to the telemetry transmitter.

* * * * *